United States Patent [19]

Yoshida et al.

[11] Patent Number: 4,745,466

[45] Date of Patent: May 17, 1988

[54] DIGITAL COLOR IMAGE PROCESSING APPARATUS WITH COLOR MASKING PROCESSING UNIT ADDRESSED BY A PLURALITY OF MULTI-BIT COLOR COMPONENT SIGNALS USING VARIOUS COMBINATIONS OF THE BITS OF THE SIGNALS

[75] Inventors: Tadashi Yoshida, Ichikawa; Kimiyoshi Hayashi, Tokyo; Shunichi Abe; Nobuo Matsuoka, both of Kawasaki; Yoshinori Ikeda, Tokyo; Mitsuo Akiyama, Murayama; Yoshinobu Mita, Kawasaki, all of Japan

[73] Assignee: Canon Kabushiki Kaisha, Tokyo, Japan

[21] Appl. No.: 585,602

[22] Filed: Mar. 2, 1984

[30] Foreign Application Priority Data

Mar. 6, 1983 [JP] Japan ................... 58-36510
Mar. 6, 1983 [JP] Japan ................... 58-36511
Mar. 6, 1983 [JP] Japan ................... 58-36512

[51] Int. Cl.[4] .................. G03F 3/08; H04H 1/46
[52] U.S. Cl. ............................. 358/80; 358/75
[58] Field of Search ........... 358/80, 75, 75 IJ, 76, 358/78

[56] References Cited

U.S. PATENT DOCUMENTS

| 3,800,079 | 3/1974 | McNeil et al. | 358/160 |
| 3,893,166 | 7/1975 | Pugsley | 358/80 |
| 4,058,828 | 11/1977 | Ladd | 358/80 |
| 4,216,503 | 8/1980 | Wiggins | 358/280 |
| 4,349,835 | 9/1982 | Horiguchi et al. | 358/80 |
| 4,402,007 | 8/1983 | Yamada | 358/80 |
| 4,468,692 | 8/1984 | Yamada et al. | 358/80 |
| 4,636,844 | 1/1987 | Sasaki | 358/80 |

FOREIGN PATENT DOCUMENTS 2053116 5/1972 Fed. Rep. of Germany.
2300514 7/1973 Fed. Rep. of Germany.
3047695 9/1981 Fed. Rep. of Germany.

OTHER PUBLICATIONS

Springstein, K. A.: Elektronische Bildverarbeitung von A-Z, Itzehoe, Federal Republic of Germany, Verlag Beruf & Schule, 1982, pp. 68–70; 235–236.
Blay, A.: "Farbfaksimileübertragung", *Internationale Elektronische Rundschau*, 1971, Nr. 2, p. 39, 40.
"Chromagraph 399—der neue Multicolor—Scanner mit Laser", *Klischograph 1982*, pp. 4–5.

Primary Examiner—James J. Groody
Assistant Examiner—Randall S. Svihla
Attorney, Agent, or Firm—Fitzpatrick, Cella, Harper & Scinto

[57] ABSTRACT

An image processing apparatus receives color data and includes a masking processing circuit for modifying the colors represented by the color data by processing each of the different color data received. The colors are modified according to other color data associated with each of the colors represented by the color data. The masking processing circuit includes a first memory for storing data representing each color and a second memory for storing data from the data derived after masking processing the data stored in the first memory. The color data and the other color data are used as addresses in the first and second memory. The number of bits of each color data used as an address for each respective color is larger than the number of bits for each of the other color data received at that portion of the memory.

3 Claims, 21 Drawing Sheets

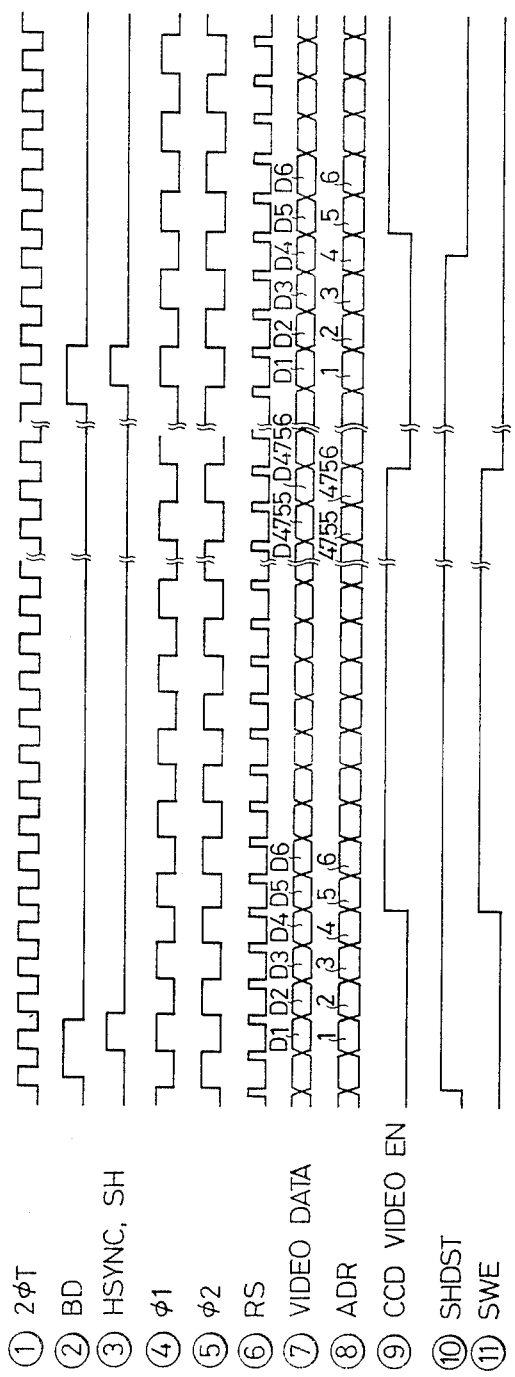

SPECTRAL REFLECTION FACTOR
OF COLOUR MATERIALS

| MIN | Y>M(160-33) | M>C(160-34) | C>Y(160-35) |
|-----|-------------|-------------|-------------|
| Y   | ○           | ×           | 1           |
| M   | 1           | ○           | ×           |
| C   | ×           | 1           | ○           |

DIGITAL COLOR IMAGE PROCESSING APPARATUS WITH COLOR MASKING PROCESSING UNIT ADDRESSED BY A PLURALITY OF MULTI-BIT COLOR COMPONENT SIGNALS USING VARIOUS COMBINATIONS OF THE BITS OF THE SIGNALS

BACKGGROUND OF THE INVENTION

1. Field of the Invention

The present invention relates to an image processing apparatus for processing an image by applying a digital processing technique thereto.

2. Description of the Prior Art

In the prior art, there is a color copier wherein an original image is subjected to color separation into three colors using a color separation filter, the original is scanned every color separation, a latent image is formed on a photosensitive body by a color-separated luminous image to be developed with a complimentary color developer, and the multi-color superposition is carried out to reproduce a color image.

As for these kinds of color copiers since the color balance necessary for the reproduction of color images, half tone representation and the like have been implemented by utilizing analogue characteristics of electrostatic photography, adjustment for the image exposure amount electric charging conditions for the photosensitive body and so on not only came to be more complicated, but also the variation of image quality was largely due to the change of the environment, as corona charging, the photosensitive element and the like often would be directly adversely affected by temperature and humidity.

Further, since the process of reading-out the original image to form a latent image has been put into practice through all two-dimensional optical systems, it was impossible to process the image at the separate points thereof.

SUMMARY OF THE INVENTION

In view of the aforementioned problems, the present invention has been implemented, and it is an object of the present invention to provide an improved image processing apparatus capable of reproducing a high quality image.

Another object of the present invention is to provide an image processing apparatus capable of correcting the gradient of color image data.

A further object of the present invention is to provide an image processing apparatus wherein digital processing is carried out in a real time by means of some type of memory means.

Yet another object of the present invention to provide an image processing apparatus capable of implementing color image processing at high speed.

Another object of the present invention is to provide an image reproduction apparatus which is excellent in half tone reproduction for full colors.

Another object of the present invention is to provide an improved digital processing color copier.

Another object of the present invention is to provide an image processing apparatus that makes variable the parameters concerning digital image processing.

Another object of the present invention is to provide an image processing apparatus wherein masking processing is carried out using a plurality of memory means.

Another object of the present invention is to provide an image processing apparatus wherein the number of bits of data for correction in masking processing is less than the number of bits of data to be corrected, thus reducing the manufacturing costs.

Another object of the present invention is to provide an image processing apparatus for implementing masking processing for every color in a parallel operation.

Another object of the present invention is to provide an image processing apparatus capable of selecting coefficients involved in masking processing.

Another object of the present invention is to provide an image processing apparatus capable of selecting any correction characteristics and varying them by an operator in accordance with the need therefor.

Another object of the present invention is to provide an image processing apparatus wherein $\gamma$ correction is made using a memory for use in table reference, so that the processing can be implemented on a real time basis.

Another object of the present invention is to provide an image processing apparatus wherein information quantity could be reduced by virtue of $\gamma$ correction to implement a non-linear type of $\gamma$ correction.

Another object of the present invention is to provide an image processing apparatus wherein shading correction is done for every color to improve the precision of shading correction and thus high quality color images can be reproduced.

Another object of the present invention is to provide an image processing apparatus wherein shading correction can be done for every scanning of an original image when a color image is reproduced, to implement a reliable or trustworthy correction.

Another object of the present invention is to provide an image processing apparatus wherein an original image is read out with color separation and amplified. The gain of the amplifying means is adjusted for every color, so that the characteristics of light sources and the like can be corrected with a simple construction to reproduce high quality color images.

The above and other objects, features, and advantages of the present invention will be better understood from the following detailed description taken in conjunction with accompanying drawings.

BRIEF DESCRIPTION OF THE DRAWINGS

FIG. 2-1 illustrates spectroscopic characteristics of a halide lamp and characteristics of spectral sensitivity of a CCD;

FIG. 2-2 illustrates a view of spectral sensitivity characteristics of a CCD through a dichroic mirror and a multi-layer film filter;

FIG. 2-3 illustrates a view of spectroscopic characteristics of a dichroic mirror;

FIG. 2-4 illustrates a view of spectroscopic characteristics of each color filter;

FIG. 3-1 illustrates a block diagram showing a main unit controller;

FIG. 3-2 illustrates a view of an operation part of said main unit controller;

FIG. 3-3 illustrates a view of an operation part of a subcontrol unit;

FIG. 3-4 illustrates a timing chart showing the operative timing of each portion of said color copier;

FIG. 3-5 illustrates a view showing a schematic configuration of a sequence clock generator;

FIG. 4 illustrates a block diagram showing a schematic configuration for processing the color images;

FIG. 5-1 illustrates a block diagram showing the construction of a synchronous control circuit;

FIG. 5-2 illustrates a timing chart of the signals in said synchronous control circuit;

FIG. 6-1 illustrates a view showing the construction of a CCD;

FIG. 6-2 illustrates a block diagram of a CCD driver;

FIG. 7-1 illustrates a view for explaining a distribution of quantity of light on the surface of a CCD;

FIG. 7-2 illustrates a block diagram showing a shading correction circuit;

FIG. 8-1 illustrates a block diagram showing a γ correction circuit;

FIG. 8-2 illustrates a view showing the relationship between an original concentration, characteristics of a CCD and an image processing unit, and the concentration of reproduced images;

FIG. 9-1 illustrates a view showing characteristics of spectral reflection for a toner;

FIG. 9-2 illustrates a block diagram showing a masking processing circuit;

FIG. 10-1 illustrates a block diagram showing a masking processing circuit and a UCR processing circuit;

FIG. 10-2 illustrates a view showing the condition of the signals outputted from a latch circuit in response to the magnitude of image data;

FIG. 10-3 illustrates a view describing UCR processing;

FIG. 12-1 illustrates a block diagram showing a dither processing circuit;

FIG. 12-2 illustrates a block diagram showing multi-valuation processing circuit;

DESCRIPTION OF THE PREFERRED EMBODIMENTS

Figure 1:
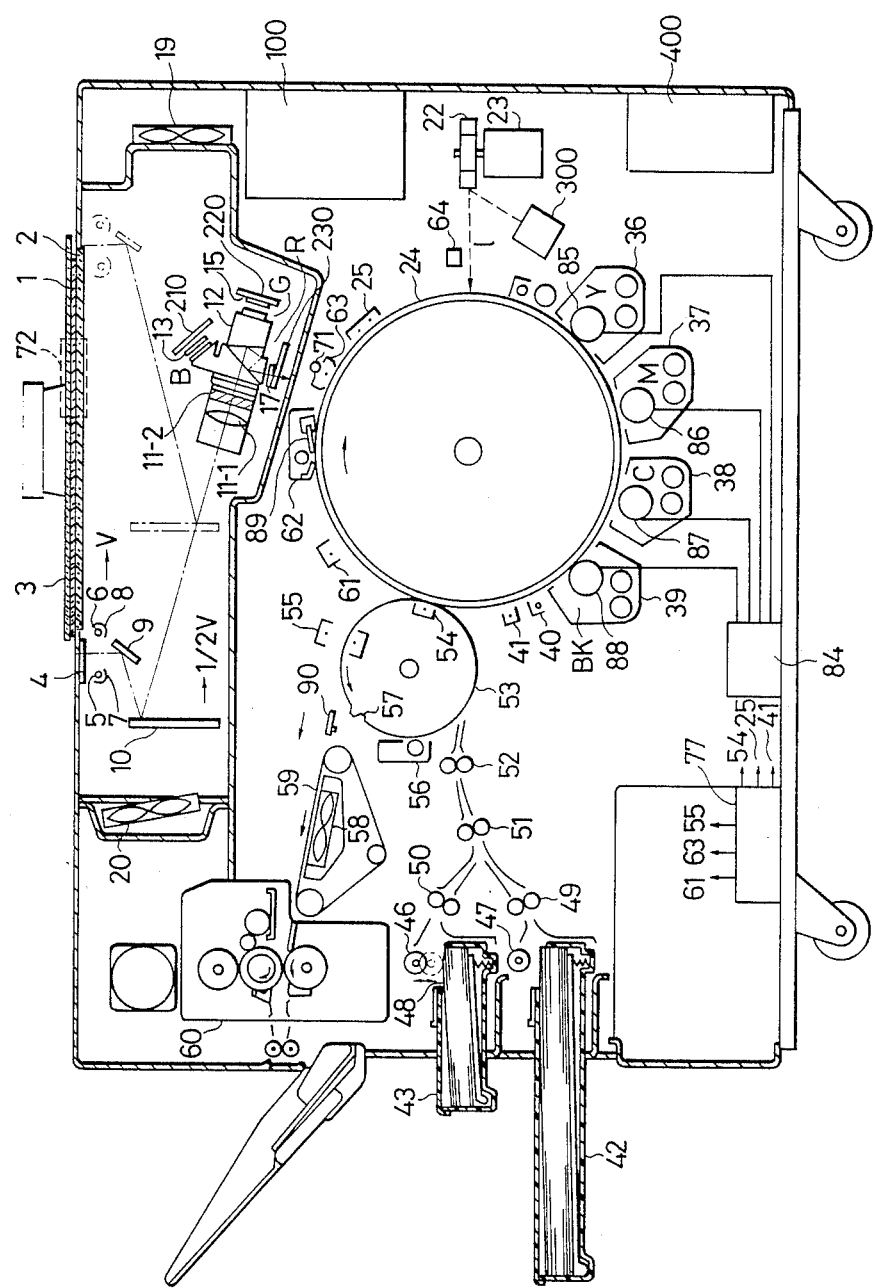
FIG. 1 illustrates a cross-sectional view of a color copier in accordance with the present invention.

The following descriptions, given in detail, are concerned with the illustrative embodiments of this invention being put into practice, shown in the drawings.

FIG. 1 shows the sectional view of a copier to which this invention is applied.

An original 1 is placed on the transparent plate of the script stand 2 and pressed by the script cover 3 from above. The light focused by the halogen lamps 5 and 6 (both illuminate the original) and light from reflectors 7 and 8 is irradiated on the original and the reflected light impinges on the movable mirrors 9 and 10. This reflected light then goes over to the dichroic mirror 12 after passing through the lens 11-1 and infrared cut filter 11-2. At the dichroic mirror 12, the light is separated into three spectral components of different wave length i.e. blue (B), green (G), and red (R). The three separated lights (B, G and R) undergo regulation of light intensity and correction of separation characteristics by means of blue filter 13, green filter 15, and red filter 17 respectively, and then the entire light is received by the solid image pickup elements (CCD) 210, 220 and 230.

The image reflected from the original 1 is formed on the solid pickup elements (CCD) 210, 220 and 230 in the same way as mentioned above, at half the moving speed of the movable mirror 9 whose motion is integrated with the halogen lamps 5 and 6. This occurs after the image goes through the lens 11-1, infrared cut filter 11-2, and dichroic mirror 12, with the length of the optical path being maintained consistently by the mirror 10 which moves in the same direction. The output of each solid pickup element undergoes digital signalization at the light-receiving unit 200 (which will be described later in connection with FIG. 4) of each CCD. The image processing unit 100 performs the required job of image processing and releases a laser beam which is modulated by an image signal from the laser modulation unit 300 to the polygon mirror 22, and then irradiates the photosensitive drum 24. The polygon mirror 22 is revolving at a regular speed controlled by the scanner motor 23 and the laser beam is vertically scanned along the direction of resolution of the photosensitive drum 24.

The photosensor 64, which is positioned before the point where laser scanning starts on the drum, produces a horizontal synchronizing signal BD of the laser caused by the passage of laser beams. After being evenly charge-erased by the charge erasure electrode 63 and charge erasure lamp 71, the photosensitive drum 24 becomes uniformly negatively charged by the negative charger 25 which is connected to the high voltage generator 77. When the laser beam (which is modulated by the image signal) impinges on the photosensitive drum 24 (which is uniformly negatively-charged), the electric charge of the photosensitive drum flows out into ground and becomes extinct due to optical conduction of electricity. The laser shall be turned on in the high-density area and turned off in the low-density area of the original. Under these conditions, the electric potential on the surface of the photosensitive body ranges form $-100$ V to $-50$ V in the high-density area and around $-600$ V in the low-density area of the original placed on the photosensitive drum 24. An electrostatic latent image is formed in this way depending on the light and dark areas of the original.

This electrostatic latent image is developed by the either yellow developer (Y) 36, magenta developer (M) 37, cyan developer (C) 38, or black developer (BK) 39, which will be selected by the signal from the control system 400. A toner picture is then formed on the surface of the photosensitive drum 24. In that instance, voltage is impressed from the developing bias generator 84 so that the electric potential of the developing sleeves 85, 86, 87 and 88 within the developer of each color should be kept between $-300$ V and $-400$ V.

The toner within the developers is stirred, and charged with negative electricity. The toner sticks to the spots where the surface potential of the photosensitive drum 24 exceeds the developing bias potential. A toner picture is thus formed in conformity with the original. Then, by means of the high voltage generator 77 and lamp 40 designed to erase the drum surface potential, the unnecessary electric charge remaining on the photosensitive drum 24 is eleminated by the negatively-charged post electrode 41, thereby equalizing the surface potential of the photosensitive drum 24.

The transfer paper, on the other hand, which is stored in the cassette 42 or 43 (selected by the operation board 72), is supplied through paper-feeding action performed by the paper feed roller 46 or 47. Oblique movement of the paper is corrected by the first resist roller 49 or 50, and the paper is conveyed within a prescribed duration of time by the convey roller 51 and second resist roller 52. The margin of the transfer paper is firmly retained by the gripper 57 of the transfer drum 53, around which the transfer paper is held in place electrostatically and wound.

The toner picture formed on the photosensitive drum 24 is transcribed onto the transfer paper by the transfer electrode 54 at the point where it comes in contact with the transfer drum 53. Transfer of the toner picture onto the transfer paper is repeated as many times as defined by the copying color mode selected. Upon completion of the transfer of all toner pictures, paper charge erasure is performed by the charge erasure electrode 55 for which high voltage is supplied from the high voltage generator 77. After the transfer is performed as many times as prescribed, the transfer paper is peeled off from the transfer drum 53 by means of the split nail 90 and directed to the fixing device 60 after being drawn onto the convey belt 59 by means of the convey fan 58.

The residual electric charge remaining on the photosensitive drum 24, on the other hand, is further erased by the pre-cleaner charge eraser 61, and the residual toner remaining on the photosensitive drum 24 is eliminated by the cleaning blade 89 located in the cleaner unit 62. Further, the electric charge on the photosensitive drum 24 is eliminated by the pre-AC charge eraser 63 and charge erasure lamp 71. The process then proceeds to the next cycle.

At 19 and 20, discharge of the lighting system is performed by the cooling fan of the optical system.

Now, the full-color mode will be explained, with the operation sequence being categorized into four colors (Y, M, C and BK). Prior to the scanning of an original 1, the white calibration plate 4 is scanned every time. This steps reads information from the white calibration plate 4 into the image processing unit 100 for one scanning line for the purpose of shading correction which will be described later. Then, as original scanning continues, the three-color (B, G and R) image is read out simultaneously at CCD 210, 220 and 230. The quantity of Y, M, C (which are the complementary colors of B, G, R respectively), and BK of black plate is calculated at the image processing unit 100 and the processing of color modification and other steps are implemented.

Original scanning is performed four times. The signal of the yellow (Y) component, calculated at the image processing unit 100, undergoes laser modulation at the first scanning, thereby forming a latent image on the photosensitive drum 24. This latent image is developed by the yellow developer 36 and transferred to the paper which is coiled round the transfer drum 53. Other images similarly are transferred to the paper, i.e. magenta (M) at the second scanning, cyan (C) at the third scanning, and black (BK) at the fourth scanning. These images are fixed by the fixing device 60, and then image recording in the full-color mode comes to completion.

Figures 1, 2:
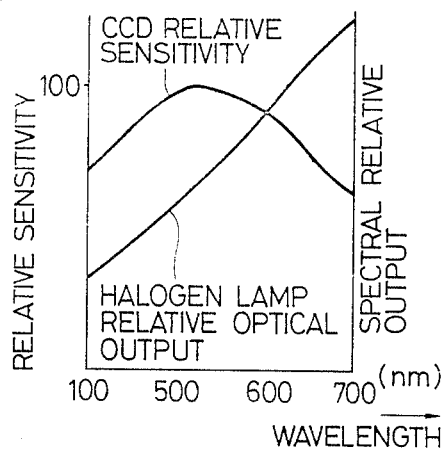
Figure 2:
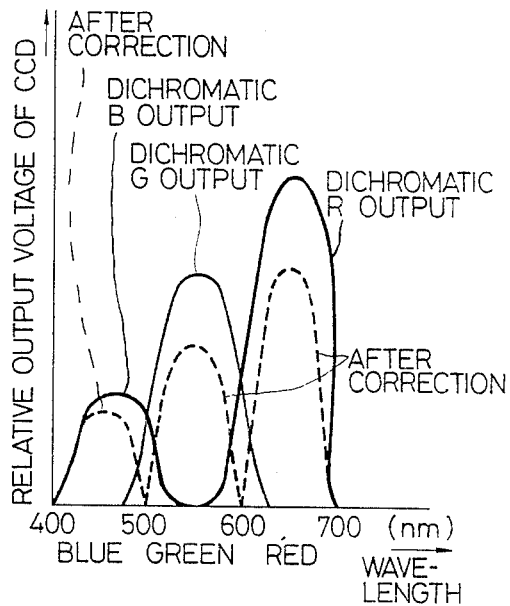

As illustrated in FIG. 2-1, the spectral energy distribution of the halogen lamp for original exposure features high optical output in the long wave area (red area) and low optical output in the short wave area (blue area). The green area ranging between 500 and 600 nm features high spectral sensitivity in CDD, as also shown in FIG. 2-1. The light reflected from the original, therefore, moves in accordance with the spectral characteristics of the halogen lamp after encountering the output from the dichroic mirror, as illustrated in FIG. 2-2.

Figures 2, 3:
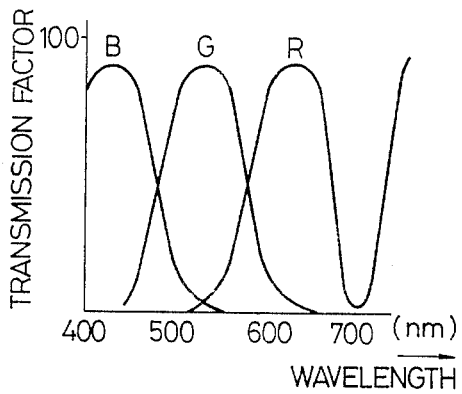
Figures 2, 3, 4:
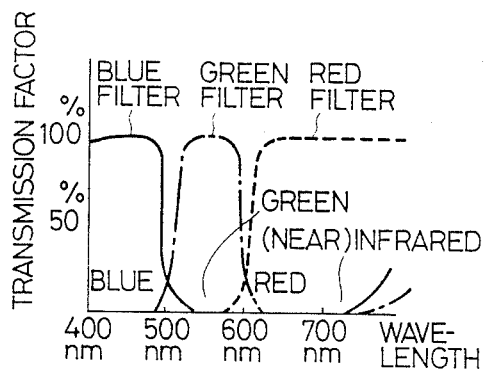

The spectral characteristics of dichroic mirrors are inferior as is obvious from FIG. 2-3. Therefore, using a multi-film interference filter featuring a spectral transmission factor as shown in FIG. 2-4, an optical image from color separation without unnecessary wavelength components may be produced as shown by the dashed line in FIG. 2-2. Also, the spectral transmission factor may be changed by overlapping a plural number of filters for each color, thereby correcting the unbalanced output as shown by the dashed line in FIG. 2-2.

A block diagram of the control unit is given in FIG. 3-1. Reference numerals 421 and 422 indicate the operating units handled by a mechanical operator. Reference numeral 422 indicates the main control unit and 421 indicates the subcontrol unit. The main control unit 422, as illustrated in FIG. 3-2, corresponds to the operating board 72 shown in FIG. 1. Reference numeral 72-9 indicates a copy button to start the copying action 72-19 represents a numerical value input keys to set the number of copies, 72-16 and 72-17 are cassette selection key to select the upper or lower cassette (42 and 43 in FIG. 1), and 72-2 to 72-8 are color mode selection keys to select the color copy mode.

For example, the 4 Full mode selected by the 72-2 key is the mode where original exposure scanning is repeated 4 times and the development by toners Y, M and C is performed in accordance with the exposed image whose color is separated into B, G and R for each scan. At the fourth scan, development by toner BK is performed corresponding to the BK component of the original, and a copy of the full color image is produced by superposing all 4-color images. Likewise, copies are produced by toners Y, M and C for each of the three exposure scans in the 3 Full mode; by toners BK and M for two exposure scans in the BK+M mode; and by a single-color toner image for one exposure scan in the BK, Y, M, C mode.

Reference numeral 72-23 indicates the 7 segment LED to show the number of copies being set, 72-18 represents the 7 segment LED to show the number of copies being counted, 72-15 is the indicator which is turned on when no feeding toner in the hopper (not illustrated) is detected by a detector (not illustrated), 72-14 is the indicator which is turned on when a jam is detected by a jam detector equipped in the paper conveying channel of the copier, 72-20 is the indicator which is turned on when no paper in the selected cassette is detected by a detector (not illustrated), and 72-1 is the wait indicator which is turned on when the surface temperature of the fixing roller in the thermal pressure fixing device does not reach a prescribed value. Copying action will not start when the indicators 72-15, 72-14, 72-20 and 72-1 are turned on. Indicator 72-21 will light when copy papers (selected by the paper size indicator) within a cassette are of A3size. Indicator 72-22 will light when copy papers are of A4 size. Indicator 72-12 is energized by means of the copy density control lever so that the lighting voltage of halogen lamps 5 and 6 decreases when the lever is shifted toward 1 and increases when it is shifted toward 8.

Sub-control (421 in FIG. 3-1) unit now will be explained with reference to FIG. 3-3. Numbers 421-14 to 421-16 represent switches connected to the correction circuit 140 (to be described hereinbelow) which corrects the gradient features of read out data against the 8-bit picture element data read out at the CCD and quantized by the A/D transducer. These switches are made up of the rotary digital code switches which give rise to each digital code. As explained later, these switches are connected so that data conversion memory elements with the required characteristics can be selected from a plural number of memory elements accommodated in the data conversion table within the correction circuit.

Reference numerals 421-5 to 421-13 are the switches to be used for masking processing. At the masking processing circuit 150 (to be described hereinbelow), the coefficients ai, bi, and ci (i=1, 2 and 3) which are used in the following conversion equations shall be established against the input image data Yi (yellow), Mi (magenta) and Ci (cyan). As in the case of switches 421-14 to 421-16 above, these are made up of the rotary digital code switches which give rise to the digital codes ranging from 0 to 16. Data conversion equations for masking processing are as given below:

$$Yo = a_1 Yi - b_1 Mi - c_1 Ci$$

$$Mo = -a_2 Yi + b_2 Mi - c_2 Ci$$

$$Co = -a_3 Yi - b_3 Mi + c_3 Ci$$

Reference numerals 421-1 to 421-4 represent the rotary digital code switches that provide coefficients of correction for the data Y, M, C and BK at the UCR processing circuit 160 (to be described hereinbelow). Reference numerals 421-20 to 421-23 correspond to output value controls connected individually to the high voltage generator 77. These controls regulate the current flowing into the charger 25 by which the photosensitive drum is equally charged with negative electricity. The pictorial light and shade of each color is adjustable and color balance is changeable by means of these output values. Switch 421-24 selects gradient characteristics at the time of multi-value dither processing, as will be explained later.

Reference numeral 411-65 in FIG. 3-1 represents the sequence controller that controls all the loads in the entire apparatus. The loads shown in the timing chart of FIG. 3-4, including the drive motor of the photosensitive drum, charge eraser, exposure lamp, etc., is driven from the sequence controller through I/O port 419 to load drive circuit 420 for a prescribed length of time conforming to the sequence control table in ROM 423. The marks $L_1, L_2 \ldots L_N$ in FIG. 3-1 stand for the value of each load, but the driving method of each load, including the solenoid, motor, and lamp, as well as the sequence control method based on a program in a ROM, are all well known, and therefore an explanation concerning these is omitted here. The main control unit 422 and the sub-control unit 421 correspond to the operating section, respectively. The driving load involves the key, lamp, LED, etc., and the drive of, or input by, these devices is implemented by the key and display controller 412.

The drive of the LED and the lamp, scanning of the keys, and method of input, for example, are performed in a well-known way, and therefore detailed explanation is omitted. The sequence of the driving method of each load is subject to the a timing chart given in FIG. 3-4. This is an example of a timing chart that brings a full color image sequence by superposing three different colors (Y, M and C). In this apparatus it is necessary to turn the photosensitive drum five times and the transfer drum ten times in order to achieve a full color image in the above three colors. The diameter of the sensitive drum 24 and transfer drum 53 therefore features a ratio of 2 to 1.

Figures 1, 3:
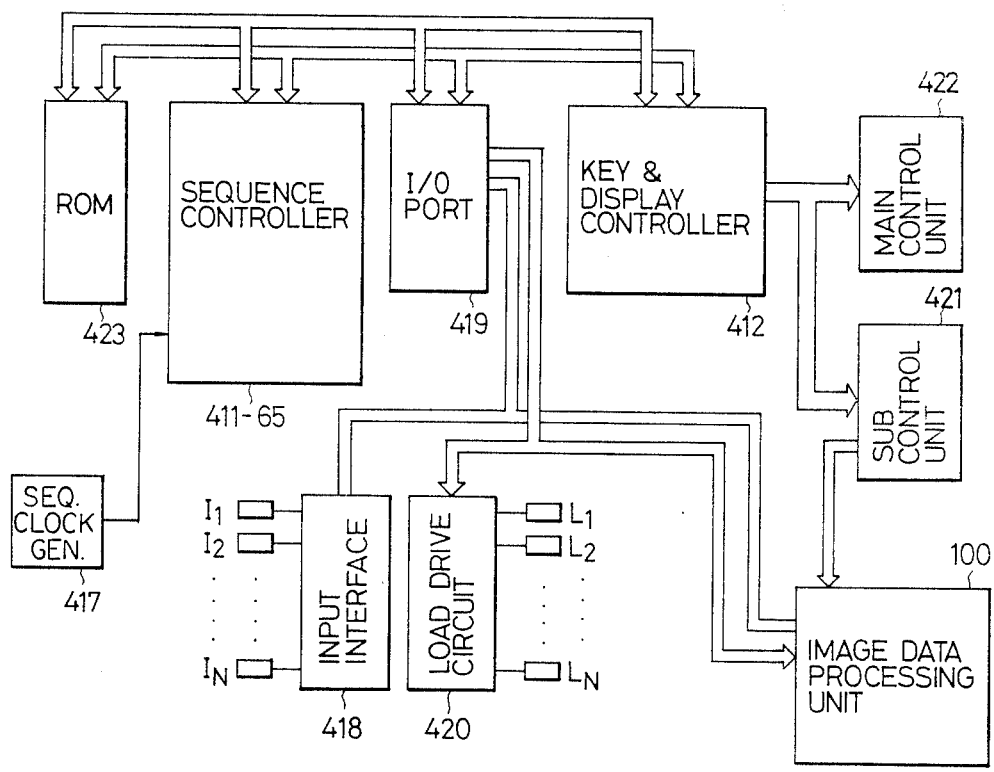
Figures 2, 3:
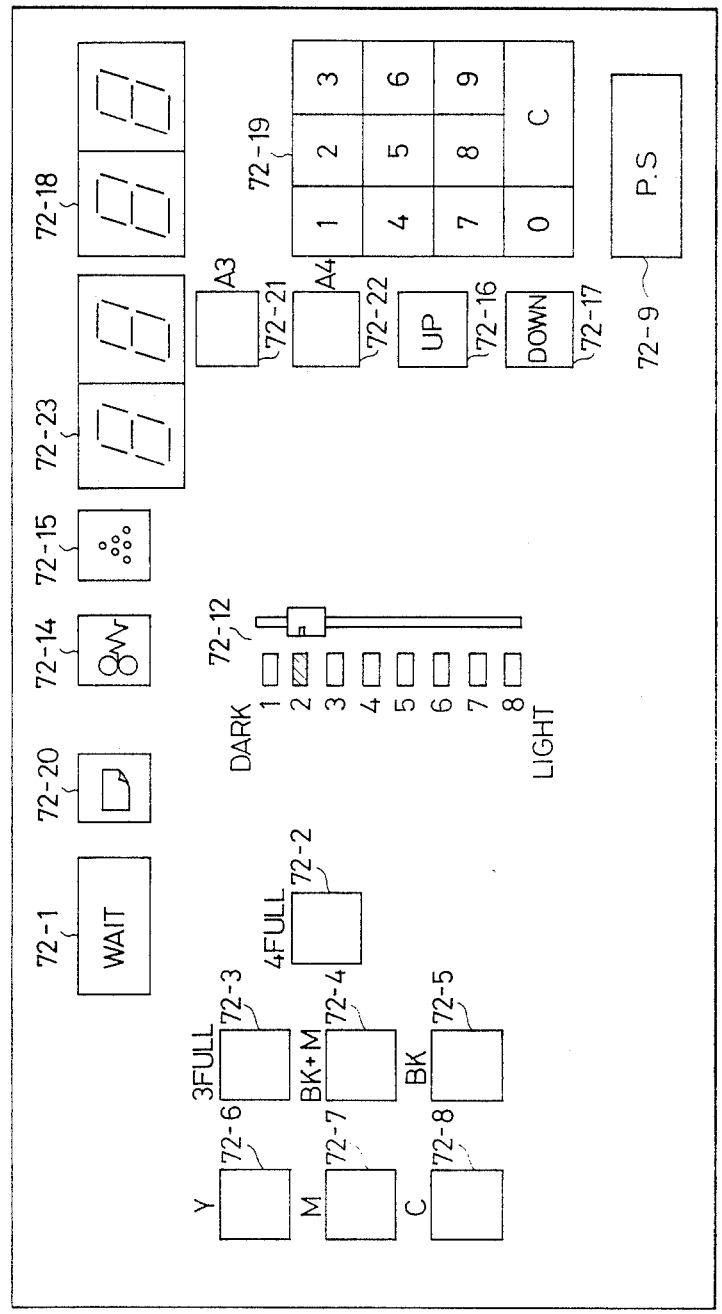
Figure 3:
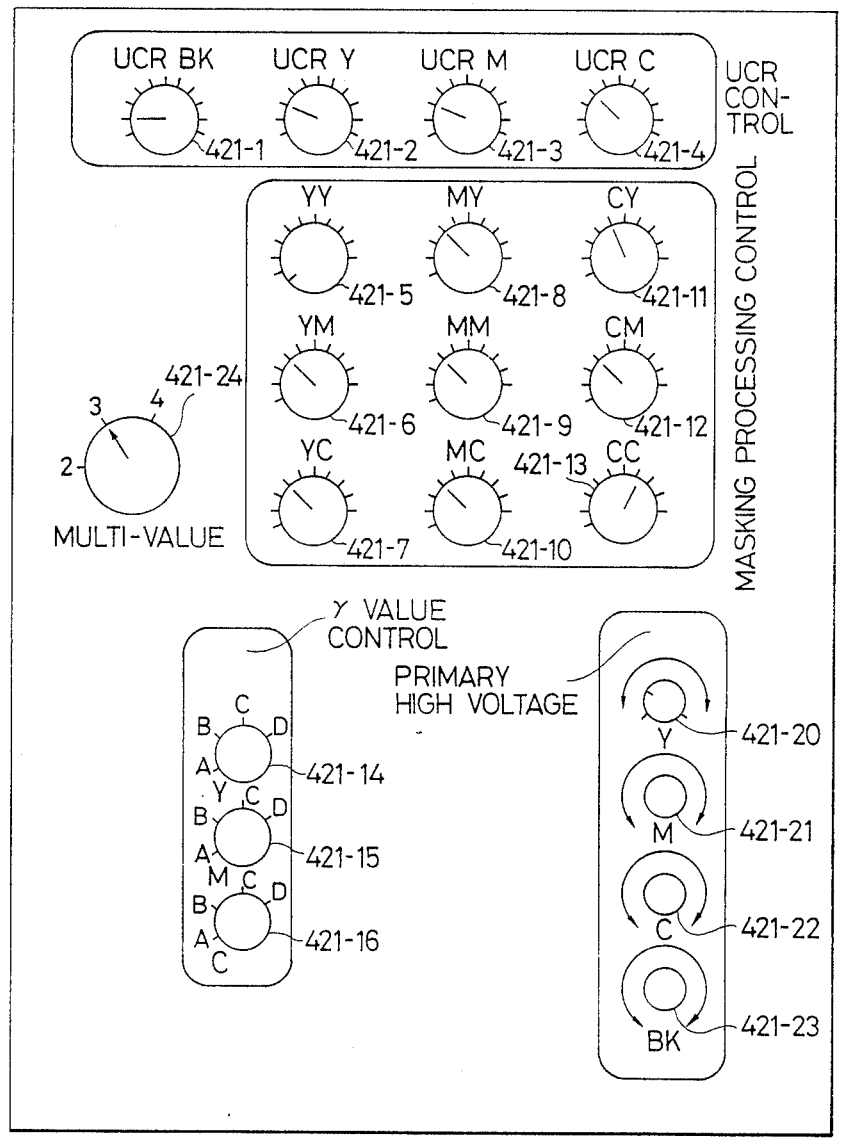
Figures 3, 4:
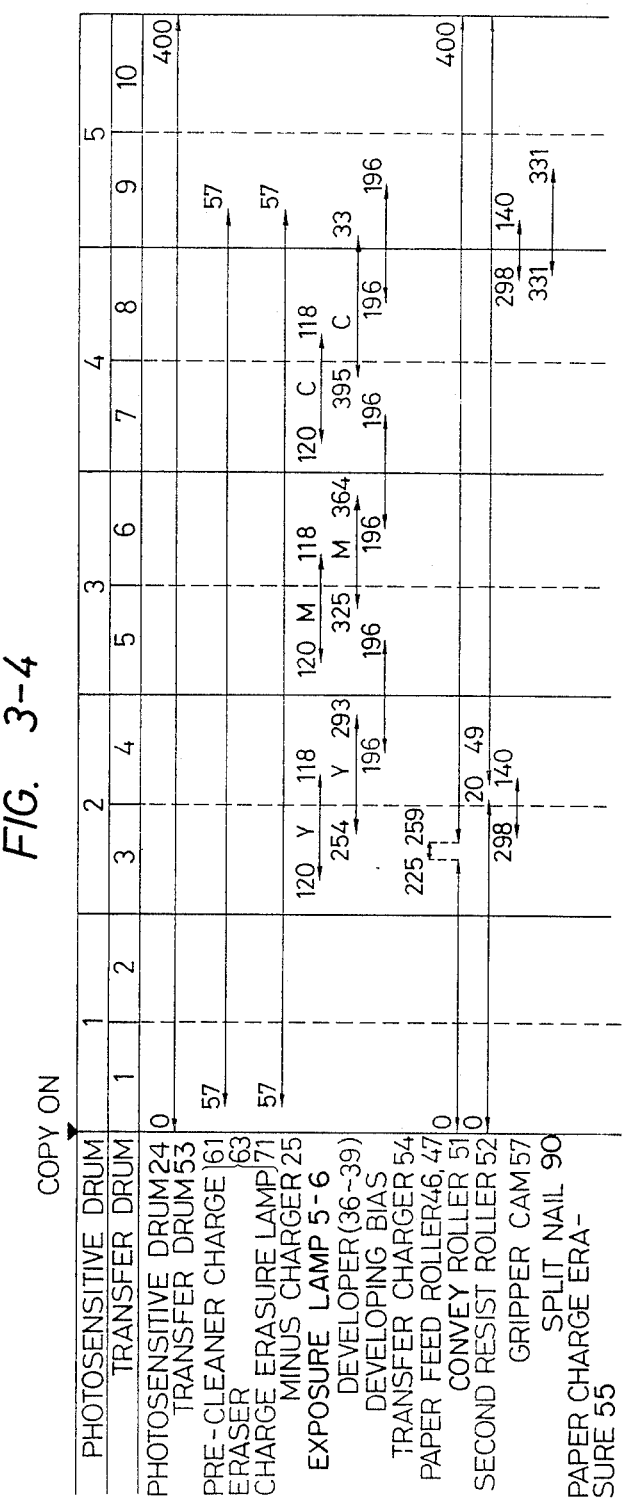
Figures 3, 4, 5:
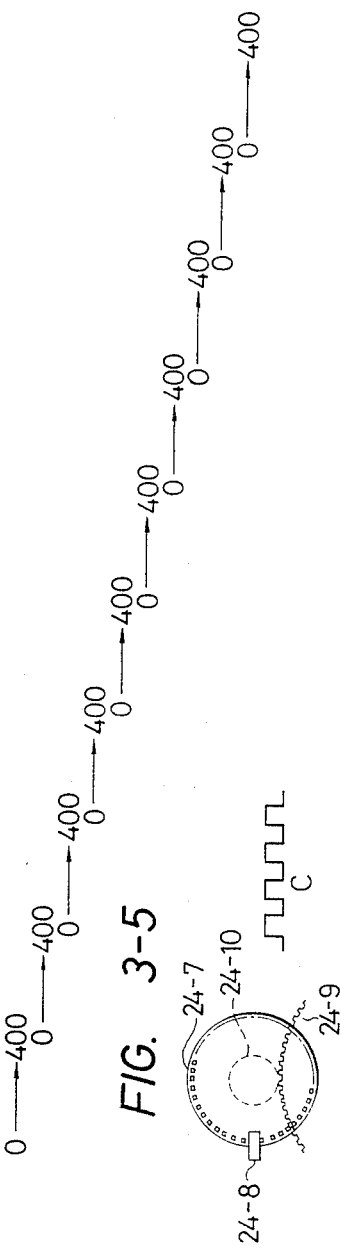
Figure 4:
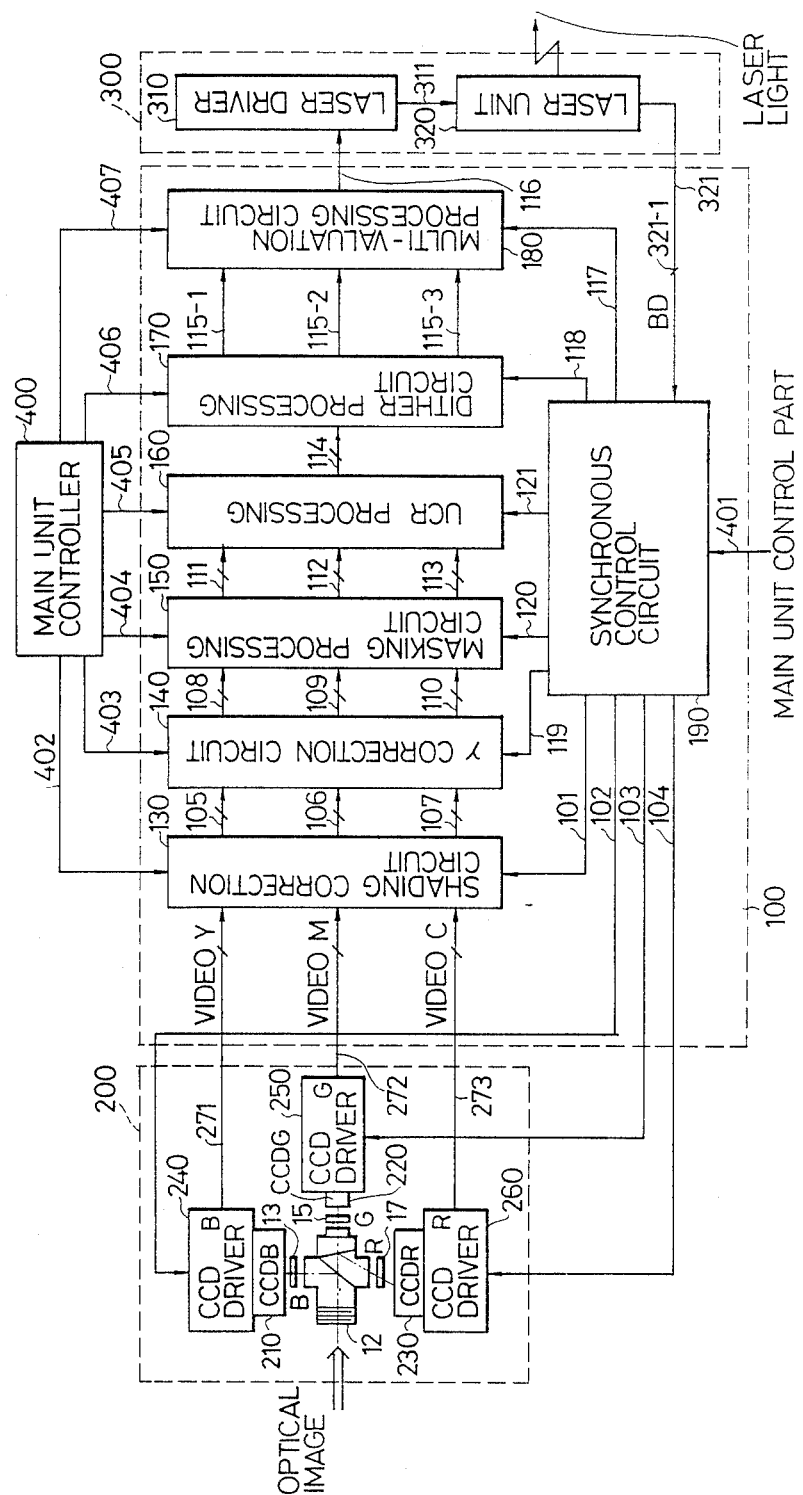
Figures 1, 5:
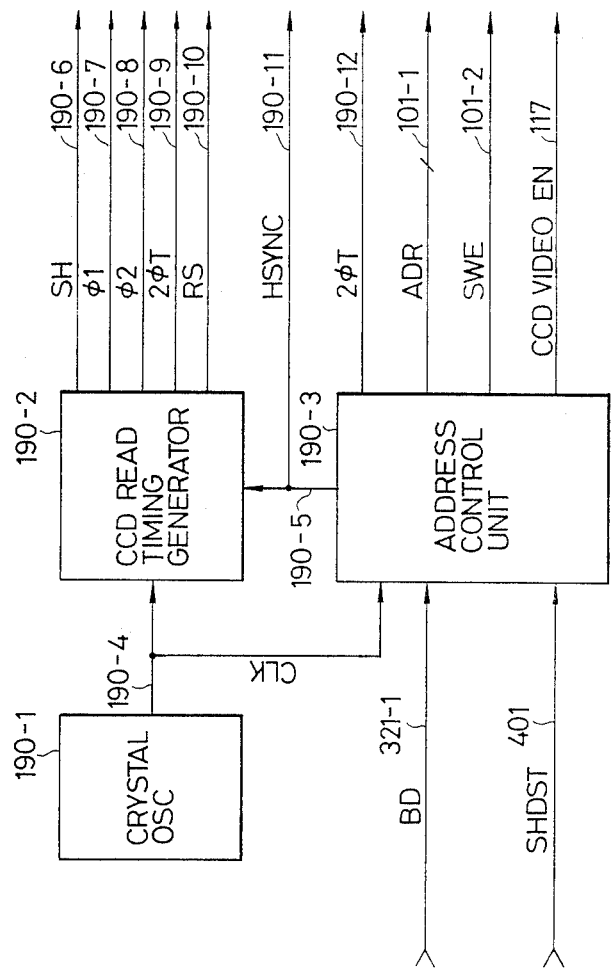

The implementation of this sequence is subject to the revolution of the photosensitive drum 24 and transfer drum 53. As illustrated in FIG. 3-5, the sequence is produced as the photosensitive drum 24 revolves by means of the clock board 24-7 which is driven by the gear 24-9 (driven by the driving shaft 24-10 of the photosensitive drum 24) as well as by means of the sequence clock generator which is composed of the photointerrupter 24-8. The sequence progresses in response to the drum clock C, with the clock counting 400 units per revolution of the transfer drum. The on-off control of the load is therefore performed on the basis of counting at the home position (hereinafter referred to as "HP") of the transfer drum 53.

In the timing chart of FIG. 3-4, the numerals indicating the operational and non-operational timing represent each clock-counting value, with the clock number at the transfer drum HP being set at 0. For example, the exposure lamp 6 goes on at clock count 120 in the third revolution of the transfer drum, at 120 in the fifth revolution, and at 120 in the seventh revolution, respectively. It goes off at clock count 118 in the fourth revolution, at 118 in the sixth revolution, and at 118 in the eighth revolution, respectively.

In light of the timing chart above, the operational steps of this appliance are outlined as follows, according to the structural drawing shown in FIG. 1. When the switching-on of copy button 72-9 is sensed by the display controller 412, the sequence controller 411-65 starts the copy sequence and begins to drive the photosensitive drum 24, transfer drum 53, first and second resist rollers 52, convey roller 51, and first resist rollers 50 and 49. After one revolution of the photosensitive drum 24, the charge on the drum surface is erased by the pre-charge erasers 61 and 63, charge erasure lamp 71, and other devices, and thereby is electrostatically equalized.

An original 1 is placed on the platen glass stand 2, and exposure scanning starts when the halogen lamps 5 and 6 (for the original exposure) go on at the 120th clock in the third revolution of the transfer drum 53. The image reflected from the original is reflected by mirrors 9 and 10, and the light is condensed by the lens 11. It then goes into the dichroic mirror 12, and the optical image reflected from the original also goes into CCD 210, 220 and 230 after being separated into the colors B, G and R by filters 13, 15 and 17. The optical image separated into colors, which is the counterpart of the original whose light is received at the CCDs, first undergoes photoelectric conversion and then data processing is performed in real time by the image processing unit (to be described later). Then, as explained before, the photosensitive drum is exposed successively in the order of Y, M and C by the laser light 1 which is modulated by the image data, and a latent image corresponding to the original is now formed on the surface of the photosensitive drum.

In the timing chart of FIG. 3-4, the latent image, formed on the photosensitive drum 24 in response to the first exposure scan, begins to operate at the 254th clock in the third revolution of the transfer drum 53, and is developed by the Y (yellow) developer 36 which ceases to operate at the 293rd clock in the fourth revolution. It then starts action at the 196th clock in the same revolution, and by means of the transfer electrode 54 which stops action at the 196th clock in the next revolution, a yellow toner image corresponding to the yellow component of the original is transferred to the paper which is wrapped around the transfer drum 53.

Likewise, a magenta toner image corresponding to the magenta component of the original is transferred to the paper in the fifth and sixth revolutions of the transfer drum 53. A cyan toner image corresponding to the cyan component of the original is transferred to the paper in the seventh, eighth, and ninth revolutions. All these are multi-transferred according to prescribed timing so that the margin of developed images Y, M and C should coincide.

The optical image reflected from the original goes into CCDs 210, 220 and 230 at the dichroic mirror 12 after being separated by filters 13, 15 and 17 into three color components B, G and R. For color correction, however, the signals G and R are used at the time of image reading to form a yellow toner image, the signals B and R are used at the time of image reading to form a magenta toner image, and the signals B and G are used at the time of image reading to form a cyan toner image. These processings are conducted successively in the order of Y, M and C.

At the 225th clock in the third revolution of the transfer drum where the first exposure scan is performed, the paper feed rollers 46 and 47 begin to work in the upper and lower cassettes respectively to feed transfer papers from the cassette 42 or 43 which is selected at the operation unit. The transfer papers fed from cassette 42 or 43 are conveyed by the first resist roller 49 or 50, and their oblique movement is corrected by the convey roller 51. At the second resist roller 52, a prescribed timing is established so that the transfer papers are held firmly by the gripper 57 of the transfer drum 53. After the margin of the paper is secured by the gripper 57, the transfer papers are fastened round the transfer drum 53 to accomplish the multiple transfer of toner images as mentioned before.

Upon completion of the multiple transfer, the transfer papers are drawn off from the transfer drum 53 by the split nail 90 and directed by the convey belt 59 to the fixing device 60, where they are fixed by thermal pressure and discharged. The operational timing pertaining to each of the loads discussed above is as shown in the timing chart of FIG. 3-4.

FIG. 4 shows a block diagram outlining the composition of this invention focusing on the image processing unit 100. The image processing unit 100 computes a proper quantity of the signals Y(yellow) M(magenta), C(cyan), and BK(black), all of which are necessary for printing based on the 3-color image signals read out at the CCD light-receiving unit 200. These colors have their respective output for the laser modulation unit 300.

In order to produce a color picture by means of this apparatus, it is necessary to scan the original four times with the CCD light-receiving unit 200 in case of 4-color (Y, M, C and BK) printing and three times in case of 3-color (Y, M and C) printing. That is to say, multicolor printing requires superposed original scanning.

The image processing unit 100 is composed of the following circuit blocks. Block 130 makes up a shading correction circuit that corrects the optically unequal illumination of the image signals read from the CCD light-receiving unit 200, where correction is performed individually at every scan for the color-separated signals Y, M and C. Block 140 is a correction circuit that corrects the gradient characteristics of each color signal in conformity with the masking and UCR corrections. Block 150 is a masking processing circuit that calculates an appropriate quantity of color-separated signals Y, M and C 111, 112 and 113, respectively, needed for printing. Block 160 is a UCR processing circuit that calculates an appropriate quantity of BK based on Y, M and C for the purpose of preparing an ink plate. Block 170 is a dither processing circuit that makes a 2-value halftone picture based on the dither method. Block 180 is a multi-valuation processing circuit that enhances the gradient characteristics of a half-tone picture by further modulating the pulse width of the 2-value image signal available from the dither processing circuit 170. The image processing unit 100 is made up of these processing circuits and synchronous control circuit 190 which synchronously controls these circuits.

The CCD light-receiving unit 200 is the section that separates an optical image into three colors (B, G and R) by means of the dichroic mirror 12 and transforms them into electric signals. The three different lights B, G and R undergo photoelectric conversion by CCD-210, CCD-220 and CCD-230, respectively. The photo-electrically converted signals B, G and R undergo 8-bit digitalization by CCD drivers 240, 250 and 260, respectively. They are further converted into signals Y, M and C which are the complementary colors of B, G and R.

The 8-bit digitalized signals Y, M and C shall be called VIDEO-Y, VIDEO-M and VIDEO-C respectively. By way of the signal lines 271, 272 and 273, respectively, VIDEOs Y, M and C are connected with the shading correction circuit 130, which performs shading correction, as already explained. The shading-corrected signals Y, M and C, i.e. VIDEOs Y, M and C, are fed into the correction circuit 140 via the signal lines 105, 106 and 107. In the correction circuit 140, the gradient characteristics are changed into those suited for color modification.

VIDEOs Y, M and C are converted into 6-bit signals in order to simplify the following processing steps. The 6-bit VIDEOs Y, M and C which have undergone correction are sent to the masking processing circuit 150 by way of the signal lines 108, 109 and 110 respectively. In the masking processing circuit 150, VIDEOs Y, M and C, 111, 112 and 113, respectively, undergo color modification to be suited for printing, and the color-modified VIDEOs Y, M and C are then sent to the UCR processing circuit 160. Based on the color-modified signals Y, M and C, the quantity of BK (black) is determined in the UCR processing circuit 160, after calculating the quantity of under colors to be eliminated. The BK-reduced quantity of Y, M and C constitutes the color-modified quantity of Y, M and C.

These 4-color image signals Y, M and C and BK are then sent to the dither processing circuit 170 through the signal line 114 in the order of Y, M, C and BK at each scan. The signal line 114 supplies the 6-bit digital signals. Based on these signals, the dither processing circuit 170 digitally implements a half-tone representation in view of the dot density per unit area. Dither processing is performed under three different threshold levels (explained later), and then 2-value signals are output on signal lines 115-1, 115-2 and 115-3.

In the multi-value processing circuit 180, a 4-value pulse width modulation is implemented on the basis of the three 2-value signals 115-1, 115-2 and 115-3. The 2-value signals having undergone pulse width modulation are sent to the laser modulation unit by way of the signal line 116. Then, laser beams are released by the laser driver 310 and laser unit 320, thereby forming a latent image on the sensitive drum 24.

The sequence control of this appliance, as well as the control of each processing unit, are performed by control unit 400.

Against the image data processing unit 100, the sequence controller 411-65 (FIG. 3) within the control unit 400 sends out yellow exposure signals before manuscript exposure scanning to form the first yellow toner image, magenta exposure signals before scanning to form the second magenta toner image, cyan signals to form the third image, and black signals to form the fourth image. These signals are carried through the signal lines 403, 404, 405 and 406 shown in FIG. 4. The signal on signal line 407 is a control signal from control unit 400 to multi-valuation processing circuit 180. The exposure lamp irradiates the white calibration plate 4 when exposure scanning for each color starts. At that time the exposure start signal (shading start signal) 402 is sent out to the shading correction circuit 130. After receiving this signal, the shading correction circuit 130 reads the image data for correction corresponding to the white calibration plate to implement the shading correction as explained in detail later.

FIG. 5-1 illustrates the construction of the synchronous control circuit 190 which has been shown in FIG. 4. The synchronous control circuit consists of the crystal oscillator 190-1, CCD read timing generator 190-2, and address control unit 190-3. Synchronizing with the beam detect signal BD 321-1 per one-line scanning from the laser scanner, the synchronous control circuit drives the CCD and counts the serial picture element data released from the CCD as well as performs address control per scanning line.

The clock CLK 190-4, whose frequency is four times as high as the image transmission clocks $2\phi T$ 190-9 and 190-12, is fed from the crystal oscillator 190-1 to the CCD read timing generator 190-2 and address control unit 190-3. The serial image data released from the CCD is transmitted by the image transmission clock $2\phi T$ 190-9 to the CCD drivers B-240, G-250 and R-260 via signal lines 102, 103 and 104. The image transmission clock 190-12 sends data to each processing circuit of the image processing unit 100 via signal lines 101, 119, 120, 121, 118 and 117 (FIG. 4).

Synchronizing with the beam detect signal BD 321-1, the address control unit 190-3 produces the horizontal synchronizing signals HSYNC 190-5 and 190-11. By means of these synchronizing signals, the CCD read timing generator 190-2 sends out the shift phase SH 190-6 (a signal that starts the reading of CCDs B-210, G-220 and R-230) to the CCD drivers B-240, G-250 and R-260 via signal lines 102, 103 and 104, thereby starting the one-line output.

The $\phi 1$ 190-7, $\phi 2$ 190-8 and RS 190-10 are the signals needed for CCD driving. The CCD read timing generator 190-2 feed these signals to the CCD drivers 240, 250 and 260 via signal lines 102, 103 and 104. These signals will be discussed later.

The address line ADR 101-1 is a 13-bit signal line that counts the image signal of 4752 bits released from the CCD per line. This image signal is sent to the shading correction circuit 130 by way of the signal line 101. The shading start signal SHDST 401 is a signal that runs from the control unit 400 into the address control unit 190-3 and rises when scanning the white calibration plate 4 (shown in FIG. 1). This signal becomes active when the halogen lamps (for lighting the original) 5 and 6 are turned on and the optical system is positioned at the white calibration plate 4.

In that instance, the address control unit 190-3 sends out the signal SWE 101-2 to the shading correction circuit 130 via signal line 101, but that applies only to the block where the one-line image data for the white calibration plate are released from the CCD. The CCD VIDEO EN is a signal indicating the block where 4752 bits of data are released from the CCD per line. This signal is sent to the multi-value processing circuit 180 by way of the signal line 117.

FIG. 5-2 shows a timing chart that indicates the timing pertaining to each pair of the synchronous control circuit 190. The legend $2\phi T$ indicates the image transmission clock which generates the one-clock horizontal synchronizing signal HSYNC by synchronizing the beam detect signal BD (which is released from the laser scanner per line) with the image transmission clock 2 T. HSYNC is also the shift pulse SH which starts CCD reading. The legends $\phi 1$ and $\phi 2$ indicate the signals whose phase differs from each other and whose frequency is half as high as the image transmission clock $2\phi T$. Each of these signals constitutes a clock which shifts the analog shift register pertaining to the even and uneven numbers of CCD.

VIDEO DATA is the image data signal from CCD, where the first image data D1 are read from the output of shift pulse SH, leading successively to D2, D3, ... and 5000 bits. D1 to D4 are the dummy picture elements of CCD, whereas the 4752 bits from D5 to D4756 constitute the one-line image data, and the CCD VIDEO EN becomes active during this 4752-bit section. The signal RS, produced at the trailing edge of image data, is the pulse that resets the CCD shift register per shift. The shading start signal SHDST is a signal coming in from the control unit 400 of this apparatus as mentioned before; but it rises when scanning the white calibration plate 4 (shown in FIG. 1).

Explanation of the CCD light-receiving unit 200, shown in FIG. 4, is detailed as follows. The CCD light-receiving unit 200 is made up of: the dichroic mirror 12 for 3-color separation; blue filter 13 for regulating the light intensity of B, G and R available from the dichroic mirror; green filter 15; red filter 17; CCD 210 which receives the blue light; CCD 220 which receives the green light; CCD 230 which receives the red light; and CCD drivers 240, 250 and 260 which convert the complementary colors Y(yellow), C(cyan) and M(magenta) into digital quantities through A/D conversion of the output from the above devices. CCDs 210, 220 and 230 are incorporated in CCD drivers 240, 250 and 260, respectively.

Figures 1, 6:
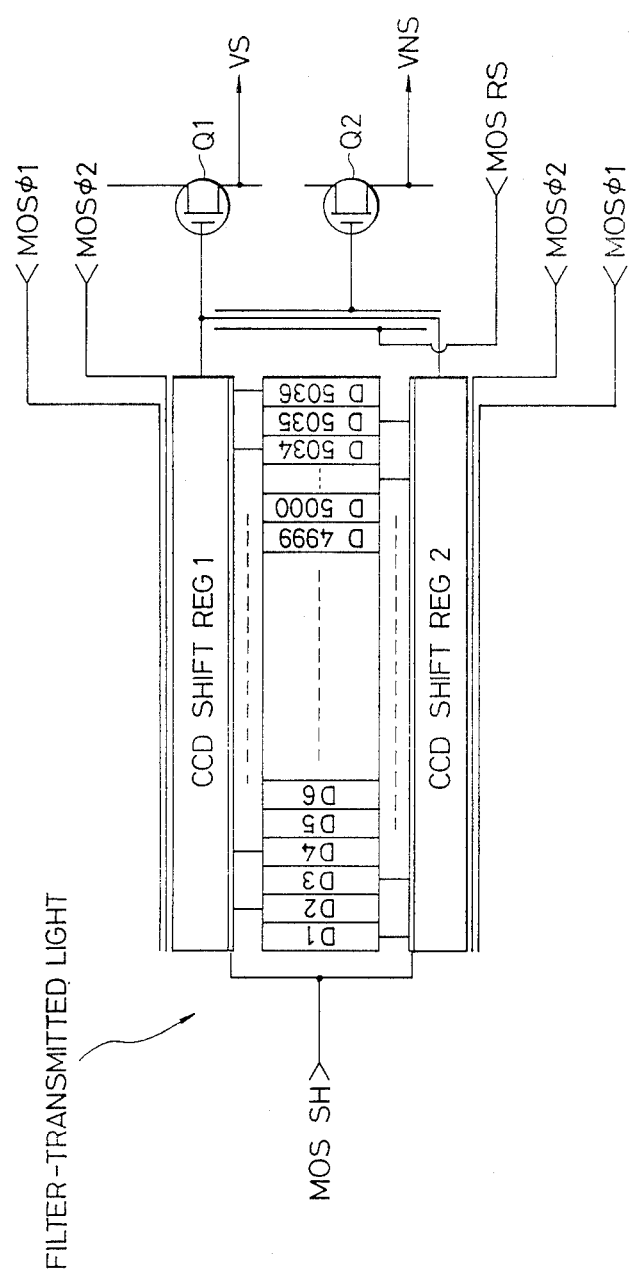
Figures 2, 6:
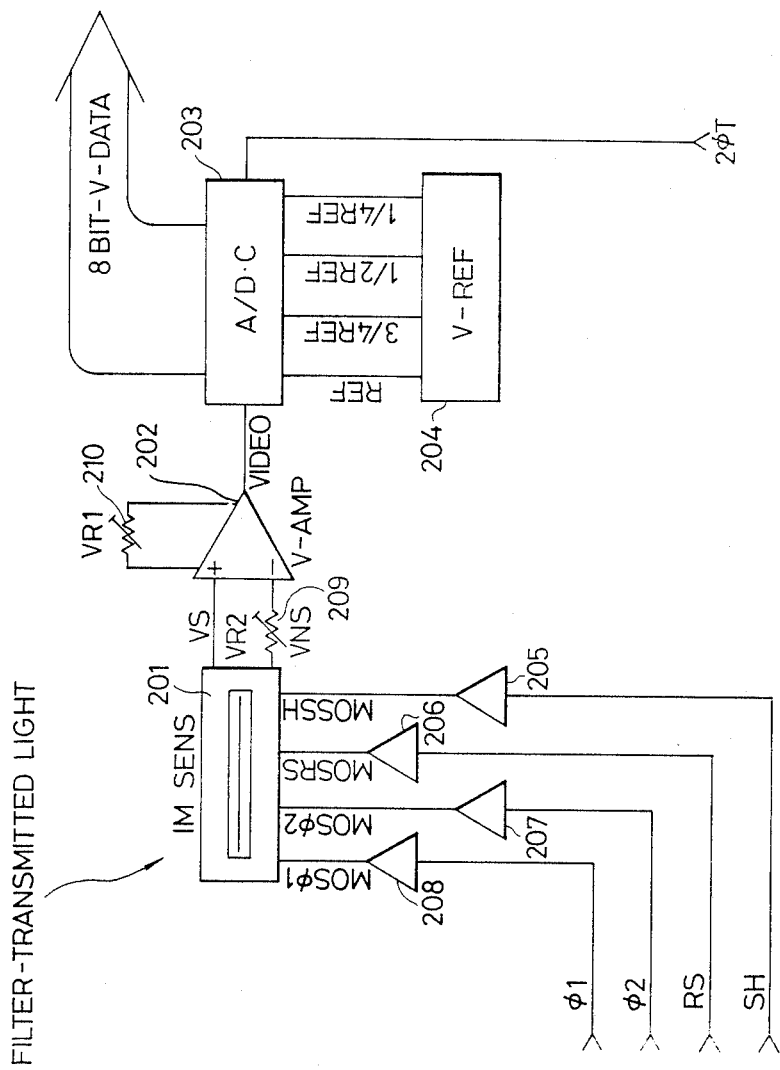

FIG. 6-1 shows the construction of each CCD. After passing through the infrared cut filter, dichroic mirror, and spectral correction filter, the original image is irradiated in the form of a slit image on the photodiode ranging between D1 and D5036. The photocurrent of the photodiode is stored in the charge storage unit (not illustrated) in the form of an electric charge proportional to the irradiation time. This electric charge is shifted to the CCD analog shift registers 1 and 2, with the shift pulse SH being added. The CCD shift registers 1 and 2 are impressed with a continuous pulse which has an antiphase consisting of MOS $\phi 1$ and $\phi 2$. The electric charge of the image, shifted from the charge storage unit of the photodiode, is transmitted in series to the output transistor circuit Q1, by means of the above clock pulse MOS $\phi 1$ and $\phi 2$, along the well of electric charge formed within the channel comprising the CCD shift registers 1 and 2.

Concurrently, a switching noise component produced by the reset signal RS, which corresponds to the above electric charge of the image, is supplied to the output transistor circuit Q2. Later, this switching noise component will be used to remove another switching noise component incorporated into the image electric charge. The image electric charge, which has been transmitted to the output transistor circuit Q1 by means of clock pulse MOS $\phi 1$ and $\phi 2$, is converted into the image voltage output VS at this point. The switching noise component corresponding to this is also converted into the switching noise voltage output VNS by means of the output transistor circuit Q2. In addition, every time an image charge undergoes voltage conversion after reading the output transistor circuit Q1, another reset pulse MOS RS is impressed in the output transistor circuits Q1 and Q2, thereby preventing the image charge from accumulating in the output transistor circuit Q1.

FIG. 6-2 shows a block diagram of the CCD driver which converts the original image (a practical example of this invention) into an electric signal. Reference numeral 201 indicates the dichroic mirror 12 and CCD linear image sensor IM SENS by which the image light passing through a light intensity adjust filter is converted into an electric signal. Reference numeral 202 indicates the differential input video amplifier V-AMP which provides differential amplification for the image voltage output VS and switching noise voltage output VNS (both are released from the IM SENS above), thereby preparing a correct image output voltage VIDEO. Reference numeral 203 indicates the video A/D converter A/D.C which converts the image output voltage VIDEO from an analog into a digital signal. Reference numeral 204 indicates the basic voltage source V-REF which supplies basic conversion voltage for the A/D converter 203 above. Reference numerals 205 to 208 indicate the pulse drive amplifiers which drive the IM SENS 201 to work. Reference numeral 209 indicates the variable resistance VR2 which eliminates the DC voltage difference between the image voltage output VS (the output of IM SENS) and switching noise output VNS. Reference numeral 210 indicates the variable resistance VR1 which establishes the amplifying output of V-AMP.

In the circuits mentioned above, the image output VS and noise output VNS (released from IM SENS 201) are added to V-AMP 202 after their DC voltage level is equalized by VR2 at the time of non-light signal. Both VS and VNS are differentially amplified by V-AMP 202, which attenuates the noise component contained in VS and prepares the image signal VIDEO through VR1 to be suited for the input of A/D.C 203.

In this embodiment, a simultaneous 3-color separation is implemented by the dichroic filter 12, as discussed before. However, due to the characteristics of the light source and dichroic filter 12, as well as because of the color sensitivity of CCD linear image sensor within a CCD driver, the light input and signal output of the three CCD drivers against B, G and R are adjusted by V-AMP 202 to precisely harmonize with the non-light conditions without becoming saturated when receiving the maximum quantity of light. They are also adjusted to have a proper dynamic range so that their gain is reduced in the order of B, G and R by selecting the resistance (VR1 and VR2) against B, G and R.

Conversion of the VIDEO signal from analog to digital is performed by A/D.C 203. The timing pertaining to conversion is subject to the image transmission clock $2\phi T$ sent from the address control unit 190-3. The digitalized VIDEO signal is then transmitted to the image data processing unit 100, where it implements the various steps of image processing.

The characteristics of the light source and other factors can be corrected by adjusting the gain of the amplifier in the method similar to the above, i.e. in the form of B>G>R.

In this embodiment, the basic voltage such as $\frac{3}{4}$ REF, $\frac{1}{2}$ REF, and $\frac{1}{4}$ REF is impressed in the high-speed A/D converter A/D-C 203 at the output resistance whose level is lower than the basic voltage source V-REF 204. This is an advantage that enhances linearity in the instance of high-speed A/D conversion. Signals $\phi 1$, $\phi 2$, RS and SH, sent from the image data processing unit, are received by IM SENS 1 as a drive input after these signals are modified into proper drive voltage waveforms such as MOS $\phi 1$, MOS $\phi 2$, MOSRS, and MOSSH by means of the pulse drive amplifiers 205 to 208.

Shading Correction

Figures 1, 7:
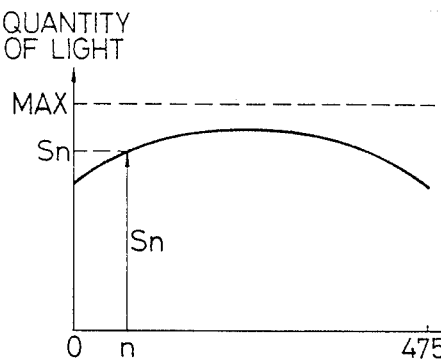
Figures 2, 7:
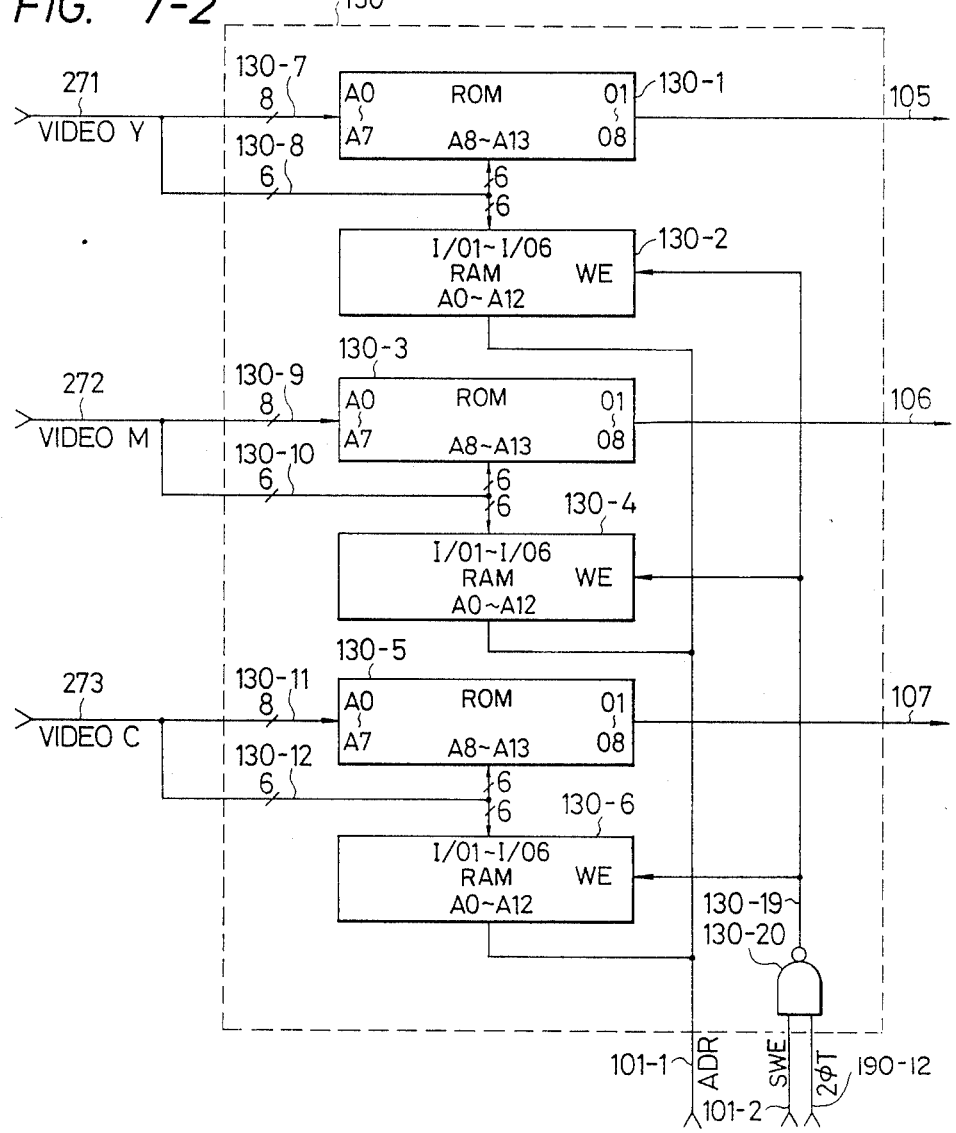

FIG. 7-1 shows the principal diagram of shading correction practiced in this example. The so-called "shading" implies an uneven optical image caused by various optical problems involving a light source, lens, and other factors. This occurs in the apparatus which reads out an image by directing the output of a light source onto an original and condensing its reflected image by lens. If the image data in the main scanning direction feature the values of 1, 2, ... n ... 4756 in FIG. 7-1, the quantity of light tends to be attenuated at both ends.

Then, to implement shading correction, the following measures are devised in the case of the shading correction circuit 130. In FIG. 7-1, the legend MAX indicates the maximum value of image level, Sn indicates the image level at the nth bit when reading the white calibration plate 4, and Dn represents the image level at the time of continuous image reading. When implementing correction per bit, the corrected image level Dn can be expressed by the following equation:

$$D'n = Dn * MAX/Sn \tag{4-1}$$

FIG. 7-2 is a detailed diagram of the shading correction circuit 130. Reference numerals 130-2, 130-4 and 130-6 indicate the shading RAM for one-line reading of the white calibration plate 4. Reference numerals 130-1, 130-3 and 130-5 indicate he shading correction ROM for providing correction output with reference to the shading data which have been stored in the shading RAM at the time of image reading.

The 8-bit image data from CCD drivers 240, 250 and 260 are put in the shading correction circuit 130 via signal lines 271, 272 and 273 respectively. First, the image data available from one-line reading of the white calibration plate 4 are stored in the shading RAMs 130-2, 130-4 and 130-6. At that time, the shading write enable signal SWE is put in the signal line 101-2 from the address control unit 190-3 (FIG. 5-1). The image transmission clock $2\phi T$ is also put in the signal line 101-3, which is gated by the NAND gate 130-20. The output of the NAND gate 130-20 is connected to the light enable terminal WE of the shading RAMs 130-2, 130-4, and 130-6 by means of signal line 130-19 and is a writing clock for the shading RAM. The shading data can be accommodated by these RAMs only when one-line reading of the white calibration is practiced in that instance, the address signal ADR 101-1 is controlled by the address control unit 190-3, and each shading RAM is designed to accommodate the image data of 4752 picture elements from the CCD output.

Image signals VIDEO Y, VIDEO M, and VIDEO C are put out from the CCD light-receiving unit 200 to the signal lines 271, 272, and 273. Each of these signals is an 8-bit digital signal to be called "VIDEO 0 to 7" (from LSB to MSB) for each bit. When the shading data in this practiced example are accommodated in the shading RAMs 130-2, 130-4, and 130-6, it is only the 6-bit digital data VIDEO 1 to 6 that are stored in each RAM as shading data per picture element by way of the signal lines 130-8, 130-10, and 130-12. The reasons why 6-bit shading data have been adopted in this case are: to reduce memory capacity; and to ensure there is no radical fluctuation in shading characteristics.

When original scanning starts after accommodation of the shading data, the 8-bit data VIDEO 0 to 7 of the image data VIDEO Y, M and C are put in the address terminals A0 to A7 of the shading correction ROMs 130-1, 130-3, and 130-5 via signal lines 130-7, 130-9, and 130-11. The 4752-bit shading data. stored in the shading RAMs 130-2, 130-4, and 130-6, are controlled by the address signal ADR 101-1 and put out to the address terminals A8 to A13 of the shading correction ROMs 130-1 130-3, and 130-5 from the terminals 1/01 to 1/06, respectively. The shading light enable signal SWE 101-2 does not become active at this time, whereas the shading correction RAMs 130-2, 130-4. and 130-6 perform a lead action.

In the shading correction ROMs 130-1, 130-3 and 130-5, the ROM data are prepared so that an operation similar to the (4-1) equation shall be implemented. Access to the shading correction ROM is available if the 8-bit image signals VIDEO 0 to 7 and 6-bit shading data work as an address. The shading-corrected output can thereby be released from the terminals 01 to 08 in the form of 8-bit image signal.

Shading correction shall be practiced for each scan of the original when the mode of multi-color superposition is employed. This method of shading correction applies to all image data.

$\gamma$ Correction

Figures 1, 8:
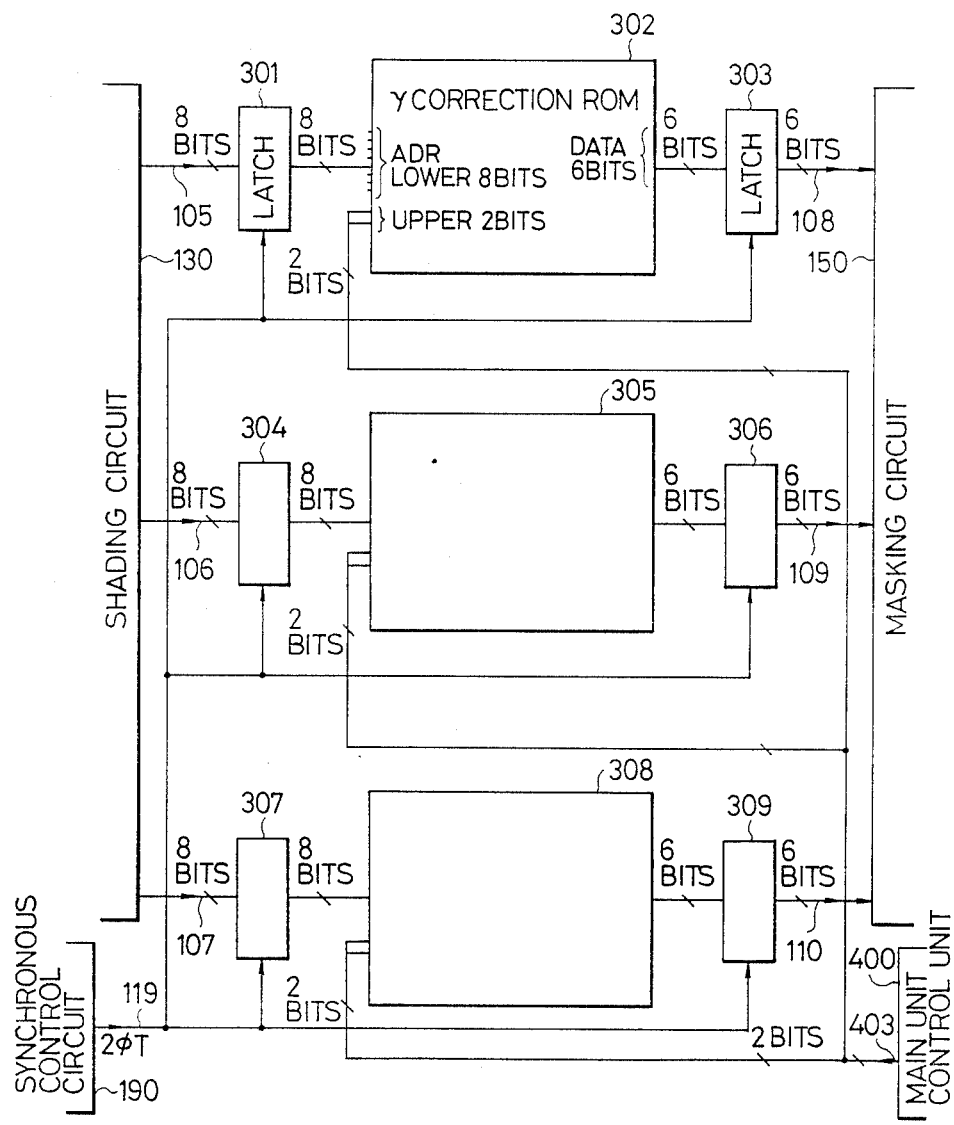
Figures 2, 8:
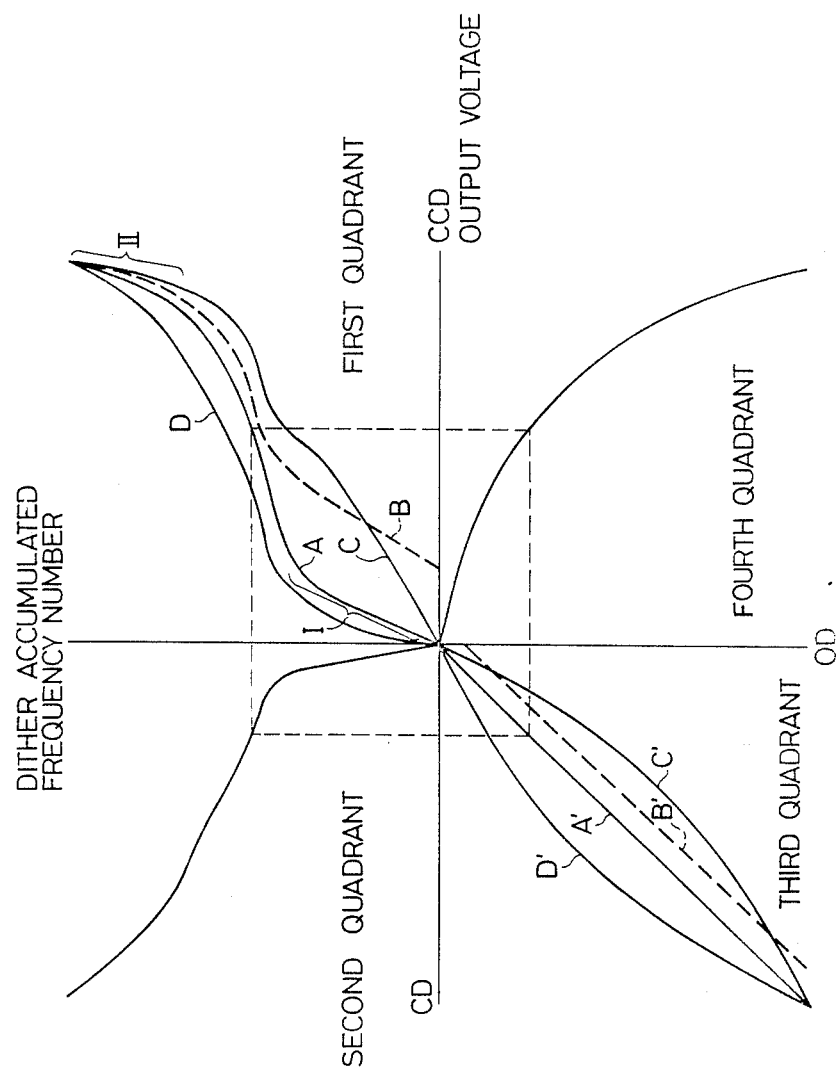

Explanation of the $\gamma$ correction goes as follows. FIG. 8-1 is a detailed block circuit diagram of the $\gamma$ correction circuit 140. This example, in which the $\gamma$ correction is implemented by means of the reference ROM for each color, features a construction where the characteristics can be selected optionally.

The 8-bit signal VIDEO Y, put out from the shading correction circuit 130, is synchronized by the synchronizing signal $2\phi T$ which is sent out from the synchronous control circuit 190 at the latch 301 to the signal line 119. The synchronized output is fed to the lower 8-bit address of the $\gamma$ correction ROM 302. The upper 2-bit address receives the input of the $\gamma$ correction select signal 403 sent from the control unit 400. The area of memory in the $\gamma$ correction ROM 302 is selected according to this select signal.

The $\gamma$-value control switch 421-14 for yellow (FIG. 3-3) of the sub-control unit 73 (located within the system control unit 400) is capable of being selected under four categories. This switch gives access to the high-speed digital signal which is fed to the upper 2 bit and lower 8-bit address of the $\gamma$ correction ROM 302. The data previously stored in the ROM 302 can thereby be released. Therefore, the data from the ROM provided at a 6-bit level. These data are further synchronized by the synchronizing signal $2\phi T$ which is sent out to the signal line 119 at the latch 303. The signal VIDEO Y is then put out to the signal line 108 after going through $\gamma$ correction in the masking circuit 150. Data conversion of the yellow (Y) signal component is thus accomplished by the $\gamma$ correction ROM 302.

The image signals VIDEO M and VIDEO C undergo similar steps of processing. After being sent out from the shading circuit 130 to the signal lines 106 and 107, the image signals VIDEO M and VIDEO C go through synchronization at the latches 304 and 307 and enter the $\gamma$ correction ROMs 305 and 308. Access to the area of the $\gamma$ correction ROMs 305 and 308 is subject to the image signals VIDEO M and VIDEO C as well as to the selection signals controlled by the $\gamma$-value control switches 421-15 and 421-16 (FIG. 3-3) of the sub-control unit 73 which is located within the system control unit 400. Output of the 6-bit $\gamma$-corrected data are implemented through this access. These $\gamma$-corrected signals VIDEO M and VIDEO C undergo synchronization in the latch circuits 306 and 309 and then come out to the masking circuit 150 via signal lines 109 and 110.

The following discussion is concerned with: how to select the $\gamma$-value control switches 421-14 to 421-16 which belong to the sub-control unit 73 of the system control unit 400; and a conversion table for the address input and output data pertaining to the $\gamma$ correction ROMs 302, 305 and 308. In this case, the $\gamma$ correction ROM 302 of the image signal VIDEO Y provides an example for the discussion.

When implementing $\gamma$ correction, it is advisable to establish a ratio of 1 to 1 between "OD" (density of a color original based on reading) and "CD" (density of a transfer paper based on depicting). In that case, there are three major factors (properties) that effect correction: properties of the CCD 210 which reads the density of a color original; properties of the image processing unit 100 by which the signal from CCD is released in the form of laser-modulated signal; density of the image depicted on a transfer paper by means of the laser-modulated signal. More detailed explanation is given to these factors by reference to FIG. 8-2.

In the fourth quadrant of FIG. 8-2, the axis of the ordinate represents OD, while that of the abscissa stands for the shading-corrected VIDEO Y. Since OD is given in logarithm, the image signal VIDEO Y features logarithmic relation with the original density OD. This relation becomes fixed depending on the properties of CCD 210 and CCD driver 240.

The second quadrant represents the relationship between CD and dither-accumulated frequency number. The dither accumulated frequency number implies the ratio between a certain entire area (in this case it indicates the dither matrix represented by the dither processing circuit 170 to be discussed later) and an inner partial area under development. The change of CD is subject to the change of dither accumulated frequency number which ranges from 0 to 100 percent. At 0%, the CD remains white, but as the former enlarges gradually, the latter begins to show a sharp increase halfway, and ultimately, i.e. at 100%, the latter becomes saturated at a certain degree of density. These tendencies become fixed depending on the properties of the sensitive drum 24, yellow developer 36, and other devices. Accordingly, the relation between CD and OD becomes established in the third quadrant, if the characteristics of the image processing unit 100 are incapable of being changed in the first quadrant.

In the image processing unit 100, the relation between CCD output and dither-accumulated frequency number can be controlled particularly by the γ correction circuit 140 and dither processing unit 170. However, the data handled by the dither processing circuit are 6-bit data (as explained later), and therefore the quantum error enlarges if the non-linear segment of the second and fourth quadrants is corrected. This is one of the shortcomings because the relation between CD and OD cannot be shown accurately even if linearity is achieved.

The input and output data of the γ correction circuit 140 are 8-bits and 6-bits, respectively, and therefore the quantum error diminishes in spite of correction. In the dither processing circuit 170, the characteristics pertaining to the first quadrant become fixed depending on the data stored in the γ correction ROM 302, if there is a linear correlation between the signals from the UCR processing circuit 160 and those released as the dither-accumulated frequency number. Therefore, if the relation between the CCD output and dither-accumulated frequency number in the first quadrant acquires the characteristics of A through γ correction, then the relation between CD and OD in the third quadrant may be established at the ratio of 1 to 1 like A.

Details of the γ correction ROM 302 are given in Table 1 as a practical example. Its characteristics are shown by the upper 2 bits of address, where "00" indicates A, "01" B, "10" C, and "11" D. When the yellow image signal VIDEO Y is put in the lower 8 bits, the 6-bit data will be output as shown in Table 1. In this way it is possible to achieve a 1 to 1 ration between CD and OD. As in the case of B' in the third quadrant, the characteristics of copy density such as lowering CD, highly contrasting C', slightly covering D', and so on, can also be controlled by choosing the γ correction switch 421-14 of the sub-control unit 73.

Quick and accurate copying is thus realized by implementing γ correction for the characteristics of a yellow signal. This also applies to magenta (M) and cyan (C) signals. whose characteristics are subject to free selection, needless to say.

TABLE 1

| Upper 2-bit address | Lower 8-bit address | Data output |
|---|---|---|
| 00 | 00000000 | 000000 |
|  | 00000001 | 000010 |
|  | ∫ | ∫ |
|  | 00001110 | 010001 |
|  | ∫ | ∫ |
|  | 00011010 | 010110 |
|  | ∫ | ∫ |
|  | 11111000 | 110000 |
|  | ∫ | ∫ |
|  | 11111110 | 111100 |
|  | 11111111 | 111111 |
| 01 | 00000000 | 000000 |
|  | ∫ | ∫ |
|  | 00010000 | 000000 |
|  | ∫ | ∫ |
|  | 11111111 | 111111 |
| ∫ | ∫ | ∫ |

The relation between the CCD output and dither-accumulated frequency number is also controllable by both the γ correction circuit 140 and the dither processing circuit 170. Since there is no linear correlation between OD (density of original) and VIDEO Y (signal released after shading correction). it is necessary to implement signal conversion based on a method mentioned before so that OD becomes proportional to VIDEO Y, whose signal has been corrected by the γ-correction ROM 302. The dither processing circuit 170, for which the γ-corrected VIDEO signal has been supplied via signal line 114, may also be corrected by the dither processing circuit mentioned later so that the CD density becomes proportional to the VIDEO signal.

Masking

Figures 1, 9:
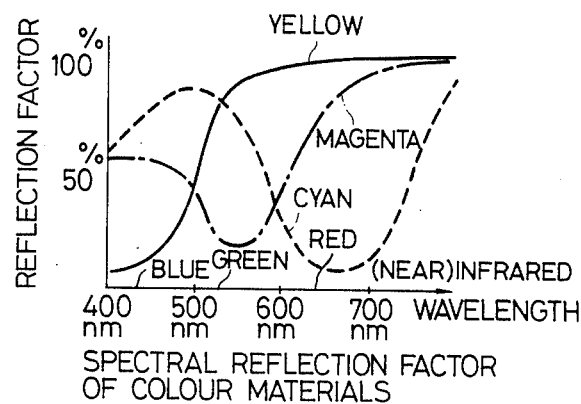
Figures 2, 9:
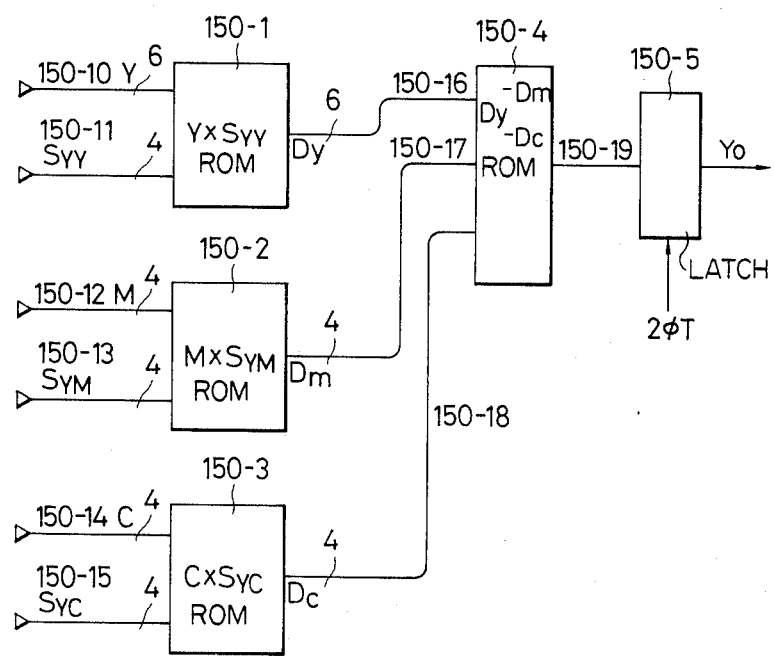

Color materials such as toner, printing ink, etc. have the spectral reflection factor shown in FIG. 9-1. The yellow (Y) color material absorbs light of 400 to 500 nm and reflects that of 500 nm or more. The magenta (M) color material absorbs light of 500 to 600 nm and reflects others, while the cyan (C) color material absorbs the light of 600 to 700 nm and reflects others.

When performing development with the Y color material, it is necessary to perform it on a latent image formed through the optical image in which the light reflected from the original is color-separated by a blue (B) filter featuring the spectral transmission factor shown in FIG. 2-4. Likewise, it is necessary to use green (G) and red (R) filters for development with the M and C color materials, respectively.

As evident from both figures, each of the filters B, G and R features a relatively good separation of color components above 500 and 600 nm, whereas the spectral reflection factor of color materials shows a bad separation depending on wavelength. M (magenta), in particular, contains a sizable quantity of Y (yellow) and C (cyan) components. C also contains a little M and Y components. Consequently, a copied color picture tends to become less true as it involves unnecessary color components, if development is performed with the above color materials based on the optical image which has undergone simple color separation.

In ordinary printing technology, therefore, a masking processing method is employed to make up for these drawbacks. In the masking processing system, the output color components Yo, Mo and Co are expressed by the following formula, with Yi, Mi and Ci representing the input color components:

$$\begin{pmatrix} Yo \\ Mo \\ Co \end{pmatrix} = M \begin{pmatrix} Yi \\ Mi \\ Ci \end{pmatrix} \quad (1)$$

$$M = \begin{pmatrix} a_1 & -b_1 & -c_1 \\ -a_2 & b_2 & -c_2 \\ -a_3 & -b_3 & c_3 \end{pmatrix} \quad (2)$$

These lead to the following formulas, thereby implementing conversion:

$$\begin{cases} Yo = a_1\ Yi\ -b_1\ Mi\ -c_1\ Ci & (3) \\ Mo = -a_2\ Yi\ +b_2\ Mi\ -c_2\ Ci & (4) \\ Co = -a_3\ Yi\ -b_3\ Mi\ +c_3\ Ci & (5) \end{cases}$$

Problems with color verity of a picture can be corrected by applying relevant coefficients (ai, bi, ci) (i=1, 2, 3) to the above formulas.

Figures 1, 10:
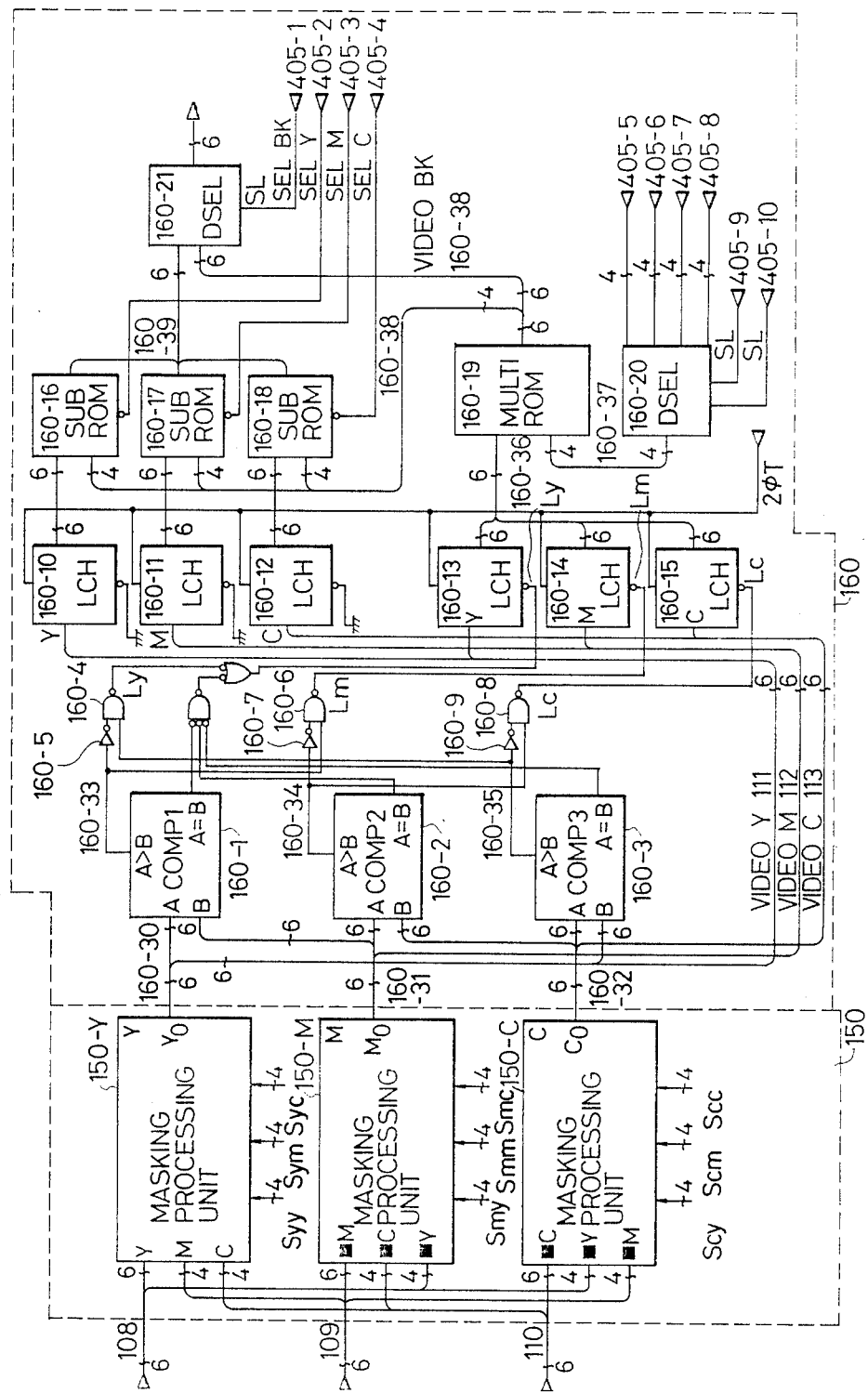
Figures 2, 3, 10:
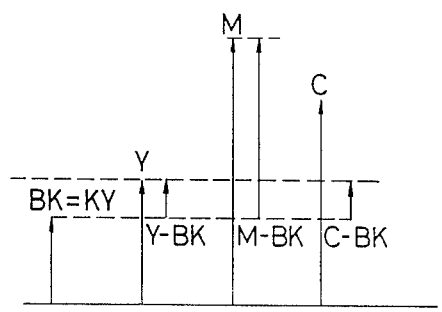

FIG. 10-1 is a detailed block diagram of the masking processing circuit 150 and UCR processing unit 160. In this figure, 150-Y, 150-M and 150-C indicate the masking processing units corresponding to the image signals Y (yellow), M (magenta), and C (cyan).

In the masking processing unit 150-Y, the formula (3) above is realized by Yi, Mi and Ci, each of which corresponds to: the 6-bit Y-component video signal VIDEO Y released via signal line 108; the upper 4 bits of the 6-bit M-component video signal VIDEO M released via signal line 109; and the upper 4 bits of the 6-bit C-component video signal VIDEO C released via signal line 110. Mi and Ci in the formula (3), Yi and Ci in the formula (4), and Yi and Mi in the formula (5) are color data for correction purposes. These color data for correction do not require higher accuracy than the color data being corrected (Yi, Mi and Ci). The coefficients (ai, bi) (i=1, 2, 3), which range over 16 steps (1/16, 2/16 ... 1) as explained later, are reduced to 4 bits against 6 bits of the data for being corrected (Yi, Mi and Ci). The capacity of ROM for conversion can thereby be reduced to one-fourth.

FIG. 9-2 is a detailed block diagram pertaining to the masking processing unit 150-Y in FIG. 10-1. Explanation of the masking processing units 150-M and 150-C is omitted since they feature the same circuit as above.

By means of the digital code switches 421-5 to 421-13 located over the sub-control unit 73 (FIG. 3-3) the following data are sent into the masking processing unit shown in FIG. 9-2. The 6-bit data Y via signal line 150-10; 4-bit data M via signal line 150-12; 4-bit data C via signal line 150-14; and 4-bit code data S-YY, S-YM and S-YC established by users via signal lines 150-11, 150-13 and 150-15. Based on the formula (3) with coefficients ai, bi and ci, the coefficient of the code data S-YY, S-YM and S-YC ($[0]_H \sim [F]_H$) turns out N/16, with the value of digital code switches 421-5 to 421-13 being set at N.

Reference numerals 150-1, 150-2 and 150-3 indicate the ROMs to be used for operation. 150-1 stands for the 6-bit signal Y. The 4-bit code data S-YY forms the address for each ROM. With the ROM data being defined by that address and the 4-bit value being set at m, the data expressed by the following equation are accommodated in 6 bits:

$$D_y = Y_{6\ bit} \times m/16 (Y = O_H \sim 3F_H, m = O_H \sim F_H)$$

Under the set value n and 4-bit code data S-YM, the following equation applies to 150-2:

$$D_m = M_4\ bit \times n/16$$

Under the set value l, the following equation applies to 150-3:

$$D_c = C_4\ bit \times l/16$$

Both $D_m$ and $D_c$ represent 4-bit data in the above equations. The data Dy, Dm and Dc, available from the above equations, will be sent to the signal lines 150-16, 150-17 and 150-18 respectively. Application of these data to the formula (3) brings the following equation:

$$D = D_y - D_m - D_c$$

If the value found from the above equation constitutes the video data for Y, the correction of Y can be implemented by applying the formula (1). The 6-bit data Y and 4-bit correction data M and C are connected to the address bath of the operation ROM 150-4, thereby providing a prescibed operation value for ROM table reference. 150-5 indicates a latch element that synchronizes with the video transmission clock $2\phi T$ to latch the 6-bit data which have undergone numerical operation for masking processing. Correction of M and C is similarly implemented in 150-M and 150-C.

UCR Processing

FIG. 10-1 shows the details of the UCR processing circuit. Equal quantities of Y, M and C, for example, may be superposed in the case of color reproduction by mixing color materials based on the subtractive mixture method. In that case, the color materials being used absorb all spectral components being separated, thereby reproducing the black (BK) color. In the BK area of the original, therefore, the toner of Y, M and C overlaps in equal quantities.

However, the spectral reflection factor applying to the toner of Y, M and C features deficient color separation caused by wavelength, as evident from FIG. 9-1. As mentioned already, the Y toner contains a little M component and the M toner contains a sizable quantity of Y and C components. Therefore, color reproduction for the BK component must be performed by means of the BK toner. In the area where BK is applied, it suffices to reduce the quantity of toners corresponding to Y, M and C. This method is called under color reduction or UCR, which is implemented in the block 160 of FIG. 10-1.

The 6-bit image data for Y, M and C are released from the masking circuit 150 by way of the signal lines 160-30, 160-31 and 160-32. These data first undergo large-small comparison between Y and M, M and C, and C and Y by means of the comparators 160-1, 160-2 and 160-3 respectively. The large-or-small comparison by these comparators is intended to latch the smallest value among the image data Y, M and C in the latch circuits 160-13, 160-14 and 160-15.

Depending on the size of those image data, the signals as shown in the table of FIG. 10-2 will be sent out to the signal lines 160-33, 160-34 and 160-35 to NAND gates 160-4, 160-6 and 160-8, through inverters 160-5, 160-7 and 160-9, respectively. Reference characters Ly, Lm and Lc are signals for indicating which one of the Y, M, and C is minimum, e.g. when Ly="1", Y is minimum. Upon comparison of the image data Y, M and C per picture element, "0" will be released to the signal line 160-33 and "1" to 160-35, when Y is the smallest. Likewise, "1" will be released to the signal line 160-33 and "0" to 160-34, when M is the smallest. "1" will be released to the signal line 160-34 and "0" to 160-35, when C is the smallest. When Y, M and C are all equal to each other (Y=M=C), the value of Y shall represent them all.

The smallest value, established by the above three comparators, is put out to the signal line 160-36 through the latch circuits 160-13, 160-14, and 160-15, and thereafter it constitutes the basic data for black ink supply. Image data Y, M, and C, released from the masking circuit 150 are latched by other latch circuits 160-10, 160-11, and 160-12 at the leading edge of the image transmission clock $2\phi T$, and then send out to the subtractive operation ROMs 160-16, 160-17, and 160-18 at the next stage. By means of the multiplication ROM 160-19, the above basic data (BK) for the ink supply which have been put out to the signal line 160-36 are multiplied by the 4-bit coefficient fed to the signal line 160-37 through the selector 160-20. The upper 4 bits of the 6-bit values (k×BK), resulting from this multiplication, are put out to the subtraction ROMs 160-16, 160-17, and 160-18 by way of the signal line 160-38. The subtraction ROMs 160-16, 160-17, and 160-18 subtract these values from each of the image data and send out the results to the selector 160-21 by way of the signal line 160-39. The selector 160-21 takes in the 6-bit ink supply data from the multiplication ROM 160-19 through the signal line 160-38.

Reference numerals 405-5 through 405-8 are input signal lines of selector 160-20. These image signals are released from the selector 160-21 in the form of 6-bit signals after the required image data are selected by the discrimination signals $S_{EL}$ BK, $S_{EL}$ Y, $S_{EL}$ M, and $S_{EL}$ C (which discriminate Y, M, C and BK) which are sent from the system control unit 400 through the signal line 405 and are provided on input terminals 405-1, 405-2, 405-3 and 405-4, respectively. The reference character SL represents a selection signal line for selectors 160-20 and 160-21. In the case of full-color mode involving four colors (Y, M, C and BK), the final output having undergone the masking and UCR processing goes through the selection signals SEL Y, SEL M, SEL C, and SEL BK per scan, which select the image data whose color has been modified in the order of Y, M, C, and BK.

The coefficients to be multiplied by the basic data of BK are selected by a series of switches 421-1 to 421-4 which are located within the sub-control unit 73 of the system control unit shown in FIG. 3-3. These coefficients are fed to the multiplication ROM 160-19 after being selected in a similar way by the selection signals 405-9 and 405-10 of the above switches released from the system control unit.

In the UCR circuit 160 of this example, as explained before, the black ink supply is implemented on the basis of the value BK which has been found through multiplication of the coefficient k by the smallest value (Y, for example) of the picture elements containing a color component as shown in FIG. 10-3. The ultimate color components of Y, M, and C, resulting from this operation, are (Y-BK), (M-BK), and (C-BK) respectively.

Multi-Gradation

Figure 11A:
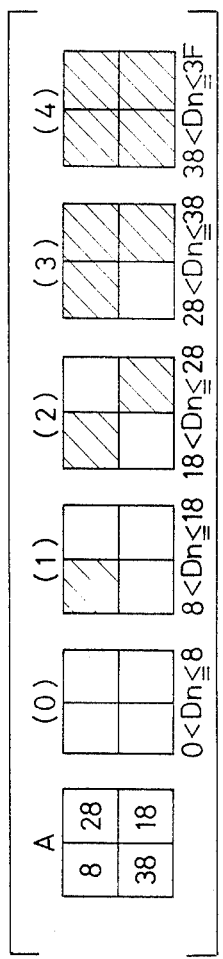
FIGS. 11A and 11B illustrate a view explaining the principle of multi-gradient processing.
Figure 11B:
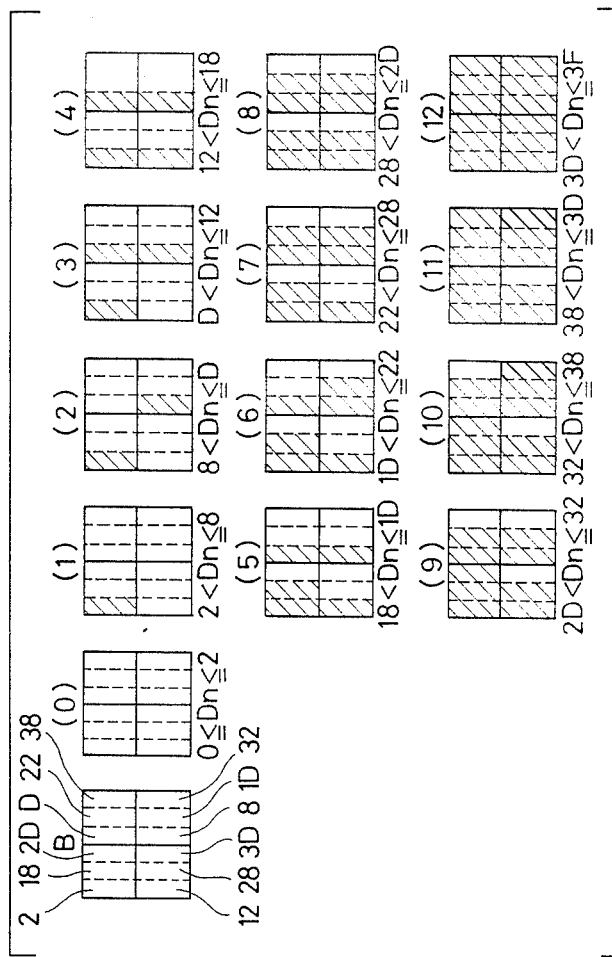

FIGS. 11A and 11B are the principal diagrams illustrating the multi-gradation processing of this example. The multi-gradation processing in this example is made up of dither and multi-value processings. An example of dither processing is given in FIG. 11A. In dither processing, the 2-value version of the 6-bit and 64-level (0 to 3F) digital image signals is brought about by changing the threshold in a certain area, thereby achieving the gradation based on an a real ratio of the dot number within that area (hereinafter referred to as "dither matrix").

In FIG. 11A-A, the threshold is changed from 8 to 18, 28, and 38 per bit in a 2×2 dither matrix. Against the values 0 to 3F of the digital image signal Dn, five different gradations are attained as shown in (0) to (4) of FIG. 11A, with "0" standing for the white block and "1" for the block with oblique lines according to 2-value signals.

Figure 13:
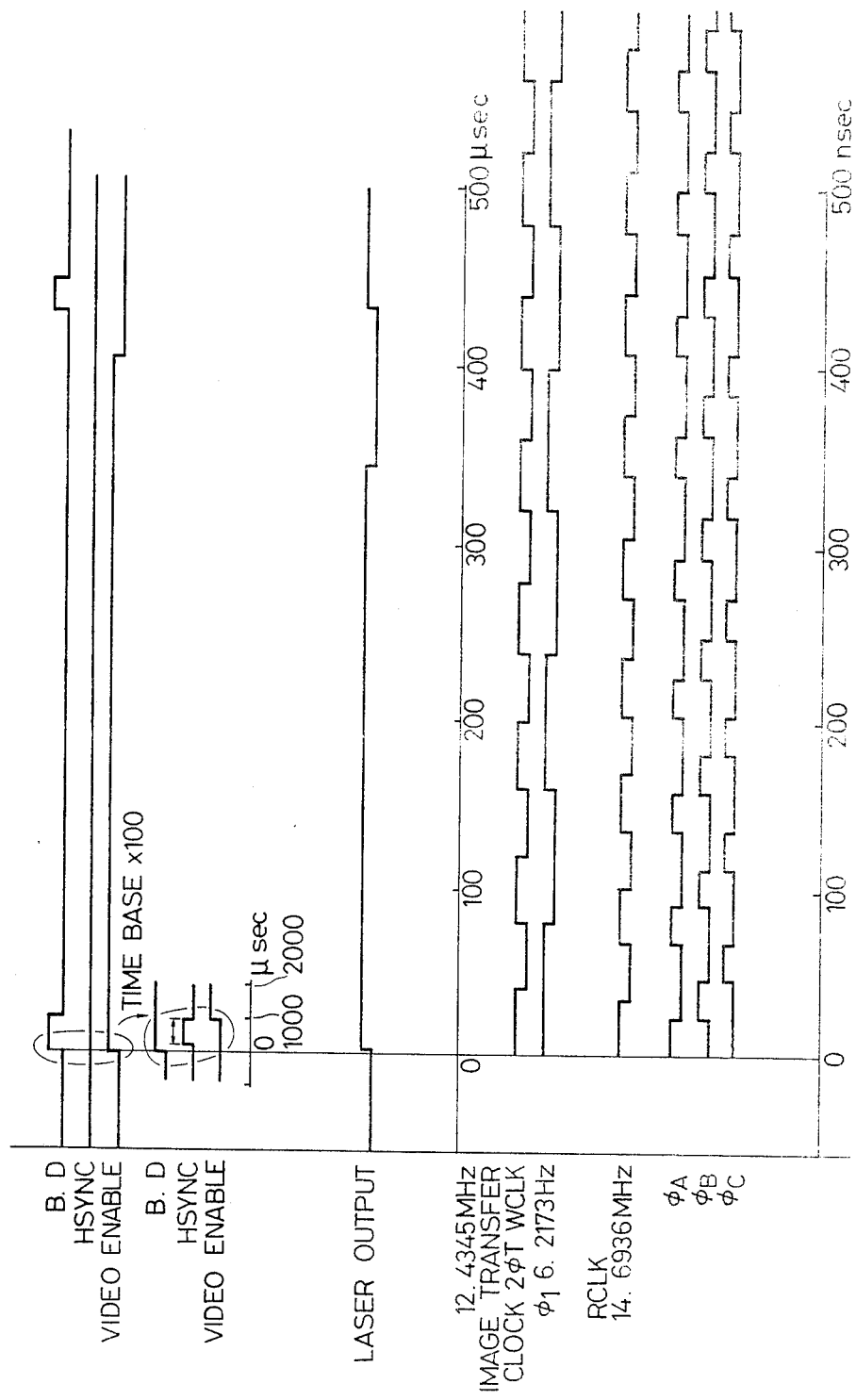
FIG. 13 illustrates a timing chart of signals in the circuit shown in FIG. 12-1 and FIG. 12-2.

The larger the dither matrix, the greater the gradation number, but pictorial resolution declines. In this invention, therefore, the gradient features are enhanced through pulse width modulation, with a picture element being further divided. FIG. 11B shows an example where 4-value dither is implemented through 3-divisional pulse width modulation. Here, a dot is divided into three parts by a perforated line, as illustrated in the figure. That is to say, a real ratio consisting of four gradations is available per dot. As illustrated in FIG. 11B-B, 13 gradations (0) to (12) are achieved by giving three more threshold levels to each dot of the 2×2 dither matrix.

In the 2-value signal under multi-gradation, therefore, a picture of good gradation characteristics is realized by emitting laser light to only the blocks with oblique lines as shown in FIG. 11B. In the case of 3-value dither matrix, a matrix is produced by dividing a dot into two parts. As for this example, the dither matrix is variable from 2×2 to 32×32, where multi-value performance may be chosen from among 2-value, 3-value, and 4-value steps by means of the switch 421-24 (FIG. 3-3) in the subcontrol unit 421. A variety of gradation can be achieved through combination of these steps. Additional other factors can also be reduced by altering the dither matrix for each color.

Figures 1, 12:
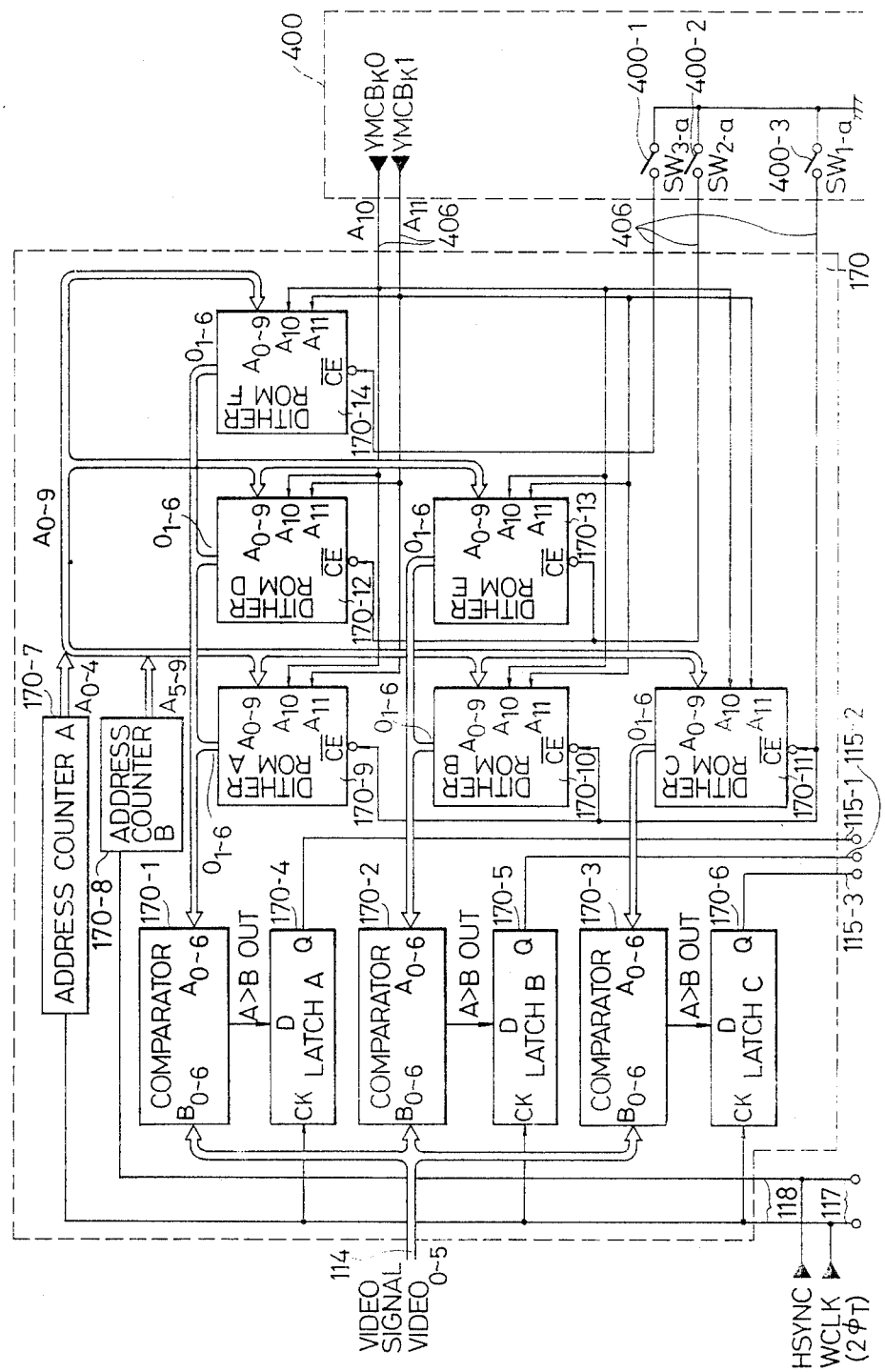
Figures 2, 12:
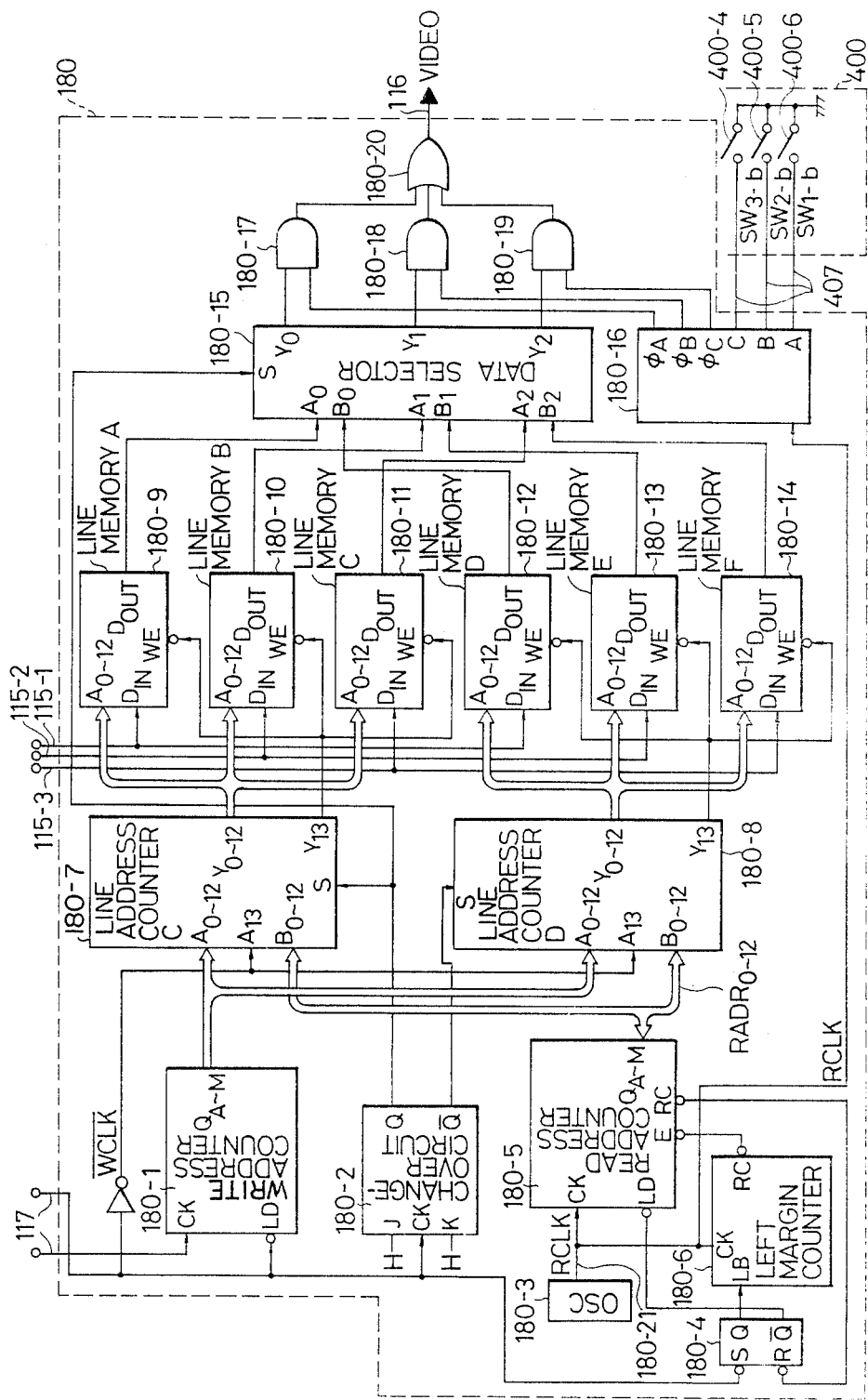

FIGS. 12-1 and 12-2 are the detailed block circuit diagrams illustrating the dither processing circuit 170 and multi-value processing circuit 180. Colors that require dither processing are determined by the 2-bit signals YMC BK-0 (A10) and YMC BK-1 (A11) which are sent from the system control unit 400 via signal line 406 (FIG. 4). Examples are given below.

| Y (yellow) | in case of | A10 = 1 and A11 = 1 |
| M (magenta) | in case of | A10 = 1 and A11 = 0 |
| C (cyan) | in case of | A10 = 0 and A11 = 1 |
| BK (black) | in case of | A10 = 0 and A11 = 0 |

Switches SW 1 to 3 are intended to select gradation characteristics and there are two contacts (a and b) in these switches. The reference characters $SW_{1-2}$, $SW_{2-2}$ and $SW_{3-2}$ represent the "2" contact of switches $SW_1$ through $SW_3$, respectively. A dot of the dither matrix can be divided into three segments by turning on the switch SW 1. A dot of the dither matrix can be divided into two segments by turning on the switch SW 2.

As an example, there is a case featuring: A10=1; A11=1; SW 1 on; SW 2 off; and SW3 off. The dither ROMs A to C will be selected in this case. Under the conditions where 6-bit (64-level) video signal is applied, the following dither patterns shall be stored in the address of each dither ROM. Dither ROM A: 00 in address 00, 03 in 01, 06 in 02, 09 in 03, 12 in 20, 15 in 21, and so on. Dither ROM B: 01 in address 00, 04 in 01, 07 in 02 and so on. Dither ROM C: 02 in address 00, 05 in 01, 08 in 02, and so on. Instead of performing comparison between the threshold of image data and dither pattern by storing dither patterns in each dither ROM, there is another dither processing method where dither-converted data are stored in a memory beforehand, and access is given to that memory, with the input image data functioning as an address.

Circuit operation under the above conditions is explained as follows. When the video signals VIDEO 0 to 5 indicate 04 under these conditions, the output Q of latch A is "1" since the video signals are greater if compared with the content 00 at the address 00 of the dither ROM A. The output Q of latch B is also "1" since video signals are greater than the current 01 at the address 00 of the dither ROM B. The output Q of latch C is also "1" since video signals are greater than the situation 02 at the address 00 of the dither ROM C. The reference characters 170-1, 170-2 and 170-3 are comparators while reference characters 170-12, 170-13 and 170-14 are dither pattern ROMs D, E and F.

The output Q of latch A is "1" as compared with the situation 03 at the address 01 of the dither ROM A 170-9 because the video signals synchronize with the next image transmission clock WCLK. The output Q of latch B is "0" because the video signals are equal to the situation 04 at the address 01 of the dither ROM B 170-10. The output Q of latch C is "0" as compared with the situation 05 at the address 01 of the dither ROM C 170-11.

In this way, the output Q of the latches A, B, and C becomes "0" or "1" depending on the results of the comparison with the situations at the addresses 02, 03, 00, 01, 02, 03, and 00 of each of the dither ROMs A, B, and C under synchronization with WCLK. If the signal HSYNC comes in at that time, the address counter B 170-8 counts up one, causing synchronization with WCLK, and then comparison with the situation is performed successively at the addresses 20, 21, 22, 23, and 20. That is to say, under synchronization with the image transmission clock WCLK, the address counter B 170-8 (upper address) (0×address–3×address) counts up every time the address counter A 170-7 (lower address) (×0 address–×3 address) counts up and $\overline{HSYNC}$ comes in.

In that instance, the output of the latches A, B and C, 170-4, 170-5, and 170-6, respectively, is stored in the line memories A, B and C, 180-9, 180-10, and 180-11, respectively, because the address of the line address counter 180-7 counts up under synchronization with the image transmission clock $\overline{WCLK}$. If the signal $\overline{HSYNC}$ comes in at that time, the output of the latches A, B and C, 170-4, 170-5, and 170-6, respectively, is stored in the line memories D, E and F, 180-12, 180-13, and 180-14, respectively, because the address of the line address counter 180-8 counts up under synchronization with WCLK. While being stored successively in the line memories D, E and F 180-12, 180-13, and 180-14, respectively, under-synchronization with $\overline{WCLK}$, the content previously stored in the line memories A, B and C, 180-9, 180-10, and 180-11, respectively, is sent successively to the data selector 180-15 because the address of the line address counter 180-7 and lead address counter 180-5 counts up under synchronization with the signal RCLK released from the oscillation circuit 180-3.

In order to form an image on a fixed spot over the drum, it is necessary, in the above conditions, to delay the start of image formation for a certain length of time after the input of the $\overline{HSYNC}$ address counter 180-5 is prohibited until this delay reaches the time equal to the value established by the left margin counter 180-6. In other words, the information stored in the line memories A, B, C or D, E, F can be sent out to the data selector 180-15 only after the prohibition terminates.

Each time the signal $\overline{HSYNC}$ comes in, the input of the data selector 180-15 undergoes alternate changeover to A and B implemented by the changeover circuit 180-2. Therefore, the output terminals of the data selector 180-15 are always sending out the signal which, under synchronization with RCLK, has been stored in either of the line memories A, B and C, 180-9, 180-10, and 180-11, respectively, or line memories D, E and F, 180-12, 180-13, and 180-14, respectively.

As illustrated in FIG. 12-2, the image transmission clock WCLK is divided into three signals $\phi A$, $\phi B$, and $\phi C$ by the multi-value oscillation circuit 180-16. The multi-value oscillation circuit 180-16 sends these three signals to the AND gates A, B and C, 180-17, 180-18, and 180-19, respectively, if its contact SW 1-b (400-6) is turned on. As a result, the outputs Y0, Y1, and Y2 having been synchronized with the RCLK of the data selector 180-15 are gated at the AND gates A, B, and C, respectively. This result is then put in the OR gate 180-20, whose output signal turns on the laser. Depending on the magnitude of the signals VIDEO 0 to 5 which have been fed into the comparator during the one wave of WCLK, the emission of laser light can be varied under four different patterns: (1) not emitted at all; (2) emitted for one-third of the time of RCLK; (3) emitted for two-thirds of the time of RCLK; and (4) emitted for three-thirds of the time of RCLK.

The time chart pertaining to the above-mentioned signals is given in FIG. 13. Explanation of these signals runs as follows:

B and D: Released every time the laser light scans over the drum.

Signal HSYNC: Becomes H only while the first 1 remains H after B and D have become H.

Signal VIDEO ENABLE: Only while this VIDEO ENABLE remains H, the video signal dither-processed at the line memory is stored in the line memory.

Signal Laser Output: Only while this laser output remains H, the laser light modulated on the drum is emitted.

Signal Image Transmission clock (WCLK $2\phi T$): Under synchronization with this WCLK, the dither-processed video signal is stored in the line memory.

Signal $\phi 1$: Under synchronization with this $\phi 1$, a signal is taken out of the line memory.

Signal $\phi A$, $\phi B$, $\phi C$: Under synchronization with $\phi 1$, the signal taken out of the line memory is divided into three by these $\phi A$, $\phi B$ and $\phi C$.

The following explanation is concerned with the case where the area subject to laser emission, during one wave of the image transmission clock WCLK, is varied under three different patterns. In this case, the switches SW1, SW2, and SW3 are OFF, ON and OFF respectively. Other conditions are the same as in the case of SW1 ON, SW2 OFF, and SW3 OFF. Dither ROMs D and E, 170-12 and 170-13, respectively, are selected under these conditions.

The function of the right address counter 180-1, read address counter 180-5, left margin counter 180-6, changeover circuit 180-2, address counters C and D, 180-7 and 180-8, respectively, is the same as in the case discussed before, and therefore explanation of these devices is omitted now.

The results of comparison between VIDEOs 0 to 5 and dither ROM D 170-12 are sent into the terminal Ao (or Bo) of the data selector 180-15 by way of the latch A 170-4 and line memory A 180-9 (or line memory D 180-12). Likewise, the results of comparison between VIDEOs 0 to 5 and dither ROM E 170-13 are sent into the terminal A1 (or B1) of the data selector 180-15 by way of the latch B 170-5 and line memory B 180-10 (or line memory E 180-13). When SW 2-6 is ON, the signal RCLK is divided into two signals $\phi A$ and $\phi B$ by the multi-value oscillation circuit 180-16, as illustrated in FIG. 13, but φC remains 0 in the mean time. As a result, the outputs Y0 and Y1, synchronized with RCLK of the data selector 180-15, are gated at the AND gates 180-17 and 180-18.

Then, the logic OR operation is effected at the OR gate 180-20, and the laser is turned on by this signal. Now, depending on the magnitude of the signals VIDEO 0 to 5 which have been fed into the comparator during one wave of the image transmission clock WCLK, the emission of laser light can be varied under three different patterns: (1) not emitted at all; (2) emitted for one-half of the time of RCLK; and (3) emitted for the time of RCLK.

The following explanation is concerned with the case where the area subject to laser emission, during one wave of the image transmission clock WCLK, is varied under two different patterns. In this case, the switches SW1, SW2, and SW3 are OFF, OFF, and ON, respectively. Other conditions are the same as in the cases of SW1 ON, SW2 OFF, and SW3 OFF. Dither ROM F 170-14 is selected under these conditions. The function of the right address counter 180-1, read address counter 180-5, left margin counter 180-6, changeover circuit 180-2, address counter C 180-7, address counter D 180-8 is the same as in the case explained before.

The results of comparison between VIDEOs 0 to 5 and dither ROM F 170-14 are sent into the terminal Ao (or Bo) of the data selector 180-15 by way of the latch A 170-14 and line memory A 180-9 (or line memory D 180-12).

In the multi-value oscillation circuit 180-16, on the other hand, Y0 is "1", Y1 "0", and Y2 "0", all remaining unchanged when SW 3-b is ON. Therefore, Y0 synchronizes with RCLK and bypasses the AND gate 180-17. Next, logic OR operation is effected at the OR gate 116, and the laser is turned on by this signal. Now, laser goes on and off in accordance with the magnitude of the signals VIDEO 0 to 5 which have been fed into the comparator in one wave of WCLK.

The type of originals is roughly grouped into three categories: 1. pictures only; 2. letters only; and 3. both pictures and letters. Pictures are further divided into those such as photographs featuring a delicate tone of color and those such as comic strips and line drawings (for coloring) involving almost primary colors only. As for photographic originals, accurate reproduction of various delicate colors is realizable through enhancement of gradation by multi-value processing.

As for comic strips and line drawings in which almost primary colors alone are involved, clear and unclouded color reproduction is realizable through 2-value processing. As for literal originals, distinct pictorial expression free from half-tone density is practicable, thereby reproducing an optimal image through changeover of switches (SW 1 to 3) depending on the type of originals.

The on-off operation of the switches SW 1 to 3 is implemented through changeover of the switch 421-24 in the sub-control unit. Switches SW1, SW2, and SW3 are designed to be on at dials 4, 3, and 2 of the switch 421-24.

The apparatus introduced in this example is designed to record images by means of laser beams, but application is not confined to this. It is also applicable to thermal printers, ink jet printers, etc. Some aspects of this invention are applicable not only to color but also to black & white image processings.

Either of the masking or UCR processings may be implemented first. It is allowable to use the B, G, and R signals transmitted from the memories of a host computer. It is allowable to read out the Y, M, C, and BK data after they have been stored in the page memory. Images may be either recorded on a transfer paper or filed on a disc. Multi-gradation is performed by time-division signals in this example, but it may also be performed through luminance modulation.

What we claim is:

1. An image processing apparatus comprising data output means for providing a plurality of color data, and masking processing means for modifying said plurality of color data by processing each of the plurality of color data provided by said data output means according to other color data respectively associated with each of the plurality of color data, wherein said masking processing means includes first memory means for providing first data in accordance with each of the plurality of color data and said respective other color data, and second memory means for providing second data in accordance with the first data provided by said first memory means, wherein each of the plurality of color data and said respective other color data are used as addresses of said first memory means, and the number of bits of each of the plurality of color data is larger than the number of bits of each of said respective other color data.

2. Color image processing apparatus comprising:
    data output means for generating a plurality of multi-bit color component signals; and
    masking processing means for producing recording color data in response to the plurality of color component signals;
    said masking processing means including memory means for storing recording color data corresponding to each of the color component signals;
    wherein said memory means is addressed by the plurality of color component signals, the recording color data in said memory means being addressed by the corresponding one of the color component signals and at least one other of the plurality of color component signals using a larger number of bits of the corresponding one of the color component signals than of said at least one other color component signal.

3. Color image processing apparatus according to claim 2, further comprising a laser unit and means for effecting pulse-width modulation of said laser unit in response to the recording color data produced by said masking processing means.

* * * * *

UNITED STATES PATENT AND TRADEMARK OFFICE
CERTIFICATE OF CORRECTION

PATENT NO. : 4,745,466

DATED : May 17, 1988

INVENTOR(S) : Yoshida, et al.

It is certified that error appears in the above-identified patent and that said Letters Patent is hereby corrected as shown below:

SHEET 6

"PAPER CHARGE ERASURE" should read

--PAPER CHARGE ERASURE ELECTRODE--.

SHEET 15

"COLOUR" should read --COLOR--.

COLUMN 1

Line 9, "BACKGGROUND" should read --BACKGROUND--; and

Line 19, "every" should read --for every--.

COLUMN 3

Line 58, "length" should read --length,--; and

Line 59, "i.e." should read --i.e.,--.

COLUMN 4

Line 35, "form" should read --from--; and

Line 58, "eleminated" should read --eliminated--.

UNITED STATES PATENT AND TRADEMARK OFFICE
CERTIFICATE OF CORRECTION

PATENT NO. : 4,745,466

DATED : May 17, 1988

INVENTOR(S) : Yoshida, et al.

It is certified that error appears in the above-identified patent and that said Letters Patent is hereby corrected as shown below:

COLUMN 5

Line 57, "wave" should read --wavelength--;

Line 58, "wave" should read --wavelength--; and

Line 60, "CDD," should read --CCD,--.

COLUMN 6

Line 16, "a" should be deleted;

Line 50, "on. Indicator" should read

--on. ¶ Indicator--; and

Line 52, "A3size." should read --A3 size--.

COLUMN 7

Line 64, "sensitive" should read --photosensitive--.

COLUMN 8

Line 38, "clock" should read --clock count--;

LIne 59, "clock" should read --clock count--;

Line 62, "clock" should read --clock count--;

Line 63, "clock" should read --clock count--; and

Line 65, "clock" should read --clock count--.

UNITED STATES PATENT AND TRADEMARK OFFICE
CERTIFICATE OF CORRECTION

PATENT NO. : 4,745,466

DATED : May 17, 1988

INVENTOR(S) : Yoshida, et al.

It is certified that error appears in the above-identified patent and that said Letters Patent is hereby corrected as shown below:

COLUMN 9

Line 21, "clock" should read --clock count--.

COLUMN 10

Line 47, delete "under";

Line 51, "M and C" should read --M, C--; and

Line 68, "sensitive" should read --photosensitive--.

COLUMN 12

Line 43, "light:" should read --light;--.

COLUMN 13

Line 33, "A/D.C" should read --A/D·C--;

Line 53, "A/D.C" should read --A/D·C--; and

Line 68, "A/D.C" should read --A/D·C--.

COLUMN 14

Line 12, "A/D-C" should read --A/D·C--; and

Line 51, "he" should read --the--.

UNITED STATES PATENT AND TRADEMARK OFFICE
CERTIFICATE OF CORRECTION

PATENT NO. : 4,745,466

DATED : May 17, 1988

INVENTOR(S) : Yoshida, et al.

It is certified that error appears in the above-identified patent and that said Letters Patent is hereby corrected as shown below:

COLUMN 15

Line 25, "data." should read --data,--;

Line 29, "130-1 130-3," should read 130-1, 130-3,--;

Line 32, "130-4. and" should read --130-4 and--; and

Line 68, "2 bit" should read --2-bit--.

COLUMN 17

Line 37, "ration" should read --ratio--; and

Line 46, "signals." should read --signals,--.

COLUMN 18

Line 3, "correction)." should read --correction),--; and

Line 46, "formula," should read --formulas,--.

COLUMN 19

Line 36, "established" should read --are established--.

COLUMN 20

Line 6, "bath" should read --path--; and

Line 7, "prescibed" should read --prescribed--

UNITED STATES PATENT AND TRADEMARK OFFICE
CERTIFICATE OF CORRECTION

PATENT NO. : 4,745,466

DATED : May 17, 1988

INVENTOR(S) : Yoshida, et al.

It is certified that error appears in the above-identified patent and that said Letters Patent is hereby corrected as shown below:

COLUMN 21  Line 59,

"on an a real" should read --on a real--.

COLUMN 23

Line 3, "current" should read --content--; and

Line 51, "lead" should read --read--.

Signed and Sealed this

Eleventh Day of July, 1989

Attest:

DONALD J. QUIGG

Attesting Officer

Commissioner of Patents and Trademarks